US012791914B2

(12) United States Patent
Bian et al.

(10) Patent No.: US 12,791,914 B2
(45) Date of Patent: Nov. 10, 2026

(54) DRIVING APPARATUS AND ELECTRONIC DEVICE

(71) Applicant: Huawei Technologies Co., Ltd., Shenzhen (CN)

(72) Inventors: Xinxiu Bian, Dongguan (CN); Dengfeng Li, Dongguan (CN); Ang Ji, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 383 days.

(21) Appl. No.: 18/274,504

(22) PCT Filed: Jan. 26, 2022

(86) PCT No.: PCT/CN2022/073976
§ 371 (c)(1),
(2) Date: Jul. 27, 2023

(87) PCT Pub. No.: WO2022/161392
PCT Pub. Date: Aug. 4, 2022

(65) Prior Publication Data

US 2024/0088748 A1 Mar. 14, 2024

(30) Foreign Application Priority Data

Jan. 28, 2021 (CN) ........................ 202110121812.1

(51) Int. Cl.
*G03B 9/06* (2021.01)
*H02K 5/04* (2006.01)
*H02K 7/14* (2006.01)

(52) U.S. Cl.
CPC ................ *G03B 9/06* (2013.01); *H02K 5/04* (2013.01); *H02K 7/14* (2013.01)

(58) Field of Classification Search
CPC . G02B 5/005; G03B 9/02; G03B 9/06; G03B 3/10; G03B 13/34; H04N 23/57
(Continued)

(56) References Cited

U.S. PATENT DOCUMENTS 4,349,265 A * 9/1982 Kobayashi ............ G03B 17/14 359/825
4,862,207 A * 8/1989 Asakura .................. G03B 9/06 396/261
(Continued)

FOREIGN PATENT DOCUMENTS

CN 108563012 A 9/2018
CN 109889711 A * 6/2019
(Continued)

*Primary Examiner* — Ricky L Mack
*Assistant Examiner* — Natasha Nigam
(74) *Attorney, Agent, or Firm* — Slater Matsil, LLP

(57) ABSTRACT

This application provides a driving apparatus and an electronic device. The driving apparatus may be applied to the electronic device. The driving apparatus includes a variable aperture. A piezoelectric ceramic of the variable aperture is configured to deform under signal control, to drive a rotation ring of the variable aperture to rotate relative to a base of the variable aperture. Each blade of the variable aperture rotates relative to the rotation ring and slides relative to a first protrusion part of the base, and a hole diameter of an aperture hole of the variable aperture changes. A change range of the aperture hole of the variable aperture in this application is not easily affected by an external magnetic force of the variable aperture.

16 Claims, 30 Drawing Sheets

(58) Field of Classification Search
USPC .......................................... 359/739; 396/505
See application file for complete search history.

(56) References Cited

U.S. PATENT DOCUMENTS

| | | | | |
|---|---|---|---|---|
| 2008/0118239 | A1* | 5/2008 | Hsiao | G02B 7/08 396/133 |
| 2008/0199177 | A1* | 8/2008 | Ide | G03B 9/06 396/510 |
| 2009/0147340 | A1* | 6/2009 | Lipton | H10N 30/883 359/230 |
| 2012/0294597 | A1* | 11/2012 | Shabtay | H04N 23/57 396/505 |
| 2014/0061467 | A1* | 3/2014 | Buzerak | G01J 5/061 359/230 |
| 2022/0247298 | A1* | 8/2022 | Jing | H04N 23/54 |
| 2022/0357635 | A1* | 11/2022 | Song | G03B 30/00 |

FOREIGN PATENT DOCUMENTS

| | | | |
|---|---|---|---|
| CN | 110568607 | A | 12/2019 |
| CN | 110602367 | A | 12/2019 |

* cited by examiner

DRIVING APPARATUS AND ELECTRONIC DEVICE

CROSS-REFERENCE TO RELATED APPLICATIONS

This application is a national stage of International Application No. PCT/CN2022/073976, filed on Jan. 26, 2022, which claims priority to Chinese Patent Application No. 202110121812.1, filed on Jan. 28, 2021. Both of the aforementioned applications are hereby incorporated by reference in their entireties.

TECHNICAL FIELD

This application relates to the field of image shooting technologies, and in particular, to a driving apparatus and an electronic device.

BACKGROUND

In recent years, while pursuing miniaturization of a camera module, major manufacturers impose a stricter requirement on imaging quality of the camera module. A conventional camera module is provided with a variable aperture. By changing an aperture hole size of the variable aperture, light intensity of incident light can be adjusted, thereby greatly improving imaging quality of the camera module. However, in the conventional variable aperture, a voice coil motor drives movement of blades, to adjust the aperture hole size. Because the voice coil motor is prone to electromagnetic interference, it is difficult to accurately adjust the aperture hole size.

SUMMARY

This application provides a driving apparatus in which a size of an aperture hole can be accurately adjusted and an electronic device.

According to a first aspect, an embodiment of this application provides a driving apparatus. The driving apparatus includes a variable aperture. The variable aperture includes a base, a rotation ring, a plurality of blades, and a piezoelectric ceramic. The base includes a body part and a first protrusion part. The bottom of the first protrusion part is fastened to the body part. The base is provided with a first via. The first via penetrates the first protrusion part and the body part. The rotation ring is sleeved on an outer peripheral side of the first protrusion part, and is rotationally connected to the first protrusion part and/or the body part. It may be understood that the rotation ring may be rotationally connected to the first protrusion part, or the rotation ring may be rotationally connected to the body part, or the rotation ring may be rotationally connected to both the first protrusion part and the body part.

The plurality of blades are located on a side that is of the first protrusion part and that is away from the body part. The plurality of blades are distributed in an annular manner, and together form an aperture hole by enclosing. The aperture hole is disposed opposite to the first via. Each blade is rotationally connected to the rotation ring, and is slidably connected to the first protrusion part.

The piezoelectric ceramic is fastened to the base and is located on an outer side of the rotation ring. The outer side of the rotation ring is a side close to an outer ring surface of the rotation ring. The piezoelectric ceramic is configured to deform under signal control, to drive the rotation ring to rotate relative to the base. Each blade rotates relative to the rotation ring and slides relative to the first protrusion part, and a hole diameter of the aperture hole changes.

It may be understood that, for a conventional variable aperture in which a size of an aperture hole is controlled by using a magnet and a coil, the aperture hole of the conventional variable aperture is likely to change slightly because of an upper limit of magnetic forces of the magnet and the coil. In other words, a change range of the aperture hole of the conventional variable aperture is limited. However, for the variable aperture in this application, the piezoelectric ceramic deforms under signal control, to push the rotation ring to rotate, thereby adjusting a size of the aperture hole. A variation range of the aperture hole of the variable aperture in this application is not affected by magnetic forces of a magnet and a coil.

In addition, the magnet and the coil of the conventional variable aperture are prone to faulty due to interference of external magnetism or a magnetic conductive component. However, the variable aperture in this application is not interfered by external magnetism or a magnetic conductive component. In this way, the variable aperture in this application has better reliability.

Second, the magnet and the coil of the conventional variable aperture increase a width of the conventional variable aperture in a width direction and a length of the conventional variable aperture in a length direction to a large extent. The piezoelectric ceramic in this application also increases a width of the variable aperture in the width direction and a length of the variable aperture in the length direction. However, in this application, the piezoelectric ceramic may flexibly use piezoelectric ceramics of different sizes based on a requirement. In this case, when a piezoelectric ceramic of a relatively small size is selected, both the width of the variable aperture in the width direction and the length of the variable aperture in the length direction can be reduced to a large extent. This facilitates implementation of a miniaturization design of the variable aperture.

In addition, in this application, for the variable aperture, the piezoelectric ceramic drives the rotation ring to rotate, to adjust the size of the aperture hole. The variable aperture in this application has a relatively high response speed.

The variable aperture in this application further has some advantages. Details are as follows.

First, in this application, a structure of the base is improved, so that when the rotation ring is assembled on the base, the rotation ring does not interfere with the first via of the base. Specifically, the base is disposed to include the body part and the first protrusion part, and the bottom of the first protrusion part is fastened to the body part. In addition, the base is provided with the first via. The first via penetrates the body part and the first protrusion part. The rotation ring is sleeved on the outer peripheral side of the first protrusion part, and is rotationally connected to the first protrusion part. In this case, the rotation ring is disposed away from the first via. In this way, when the rotation ring rotates relative to the first protrusion part, the rotation ring does not block the first via due to tilt or vibration.

In addition, in this application, the piezoelectric ceramic is disposed on the outer side of the rotation ring, to prevent the piezoelectric ceramic from interfering with the first via of the base. Specifically, when the piezoelectric ceramic is disposed on the outer side of the rotation ring, the piezoelectric ceramic is disposed away from the first via. In this way, when the rotation ring rotates relative to the first protrusion part, the piezoelectric ceramic does not block the first via due to tilt or vibration.

In addition, the piezoelectric ceramic is disposed on the outer side of the rotation ring, to avoid increasing a thickness of the variable aperture because the piezoelectric ceramic is stacked with the base and the rotation ring, thereby implementing a thin design of the variable aperture. In this way, applying the variable aperture to the electronic device is a better design for an electronic device that has relatively limited internal space and urgently requires a thin form.

In addition, by disposing the piezoelectric ceramic on the outer side of the rotation ring, a forming difficulty of the piezoelectric ceramic can be reduced, thereby implementing mass production. It may be understood that, for a piezoelectric ceramic provided with a hole or a groove, a processing difficulty is relatively high, and mass production is not easy. In this embodiment, the piezoelectric ceramic is disposed on the outer side of the rotation ring, to avoid a structure design in which a structure such as a via or a groove needs to be provided on the piezoelectric ceramic to avoid affecting the first via. In this way, the piezoelectric ceramic has a simple structure and mass production is easy to be implemented.

In addition, by disposing the piezoelectric ceramic on the outer side of the rotation ring, the piezoelectric ceramic does not interfere with the first via, so that the piezoelectric ceramic is not limited in size. Specifically, both a width of the piezoelectric ceramic in the width direction and a length of the piezoelectric ceramic in the length direction in this application can be flexibly designed based on a requirement. In this case, when the piezoelectric ceramic with a relatively small size is used, the width of the variable aperture in the width direction and the length of the variable aperture in the length direction may be greatly reduced, that is, a miniaturization design of the variable aperture is easily implemented. Applying the variable aperture to the electronic device is a better design for the electronic device whose internal space is extremely valuable.

In an implementation, the piezoelectric ceramic is in a strip shape. The piezoelectric ceramic has a simple structure and mass production is easy to be implemented. In addition, it should be understood that, for piezoelectric ceramics of different structures, different signals are used to control deformation of the piezoelectric ceramics. The piezoelectric ceramic of this implementation is in a strip shape, so that the piezoelectric ceramic has a simple structure, which helps reduce design difficulty of a required signal.

In an implementation, the rotation ring includes the outer ring surface. The outer ring surface is a surface that is of the rotation ring and that is away from the first protrusion part. The piezoelectric ceramic contacts the outer ring surface of the rotation ring. It should be understood that, in the width direction or the length direction of the variable aperture, a distance between the piezoelectric ceramic and the rotation ring is relatively short, which is conducive to a narrow design of the variable aperture.

In an implementation, the body part is provided with a first internal pin end and a first external pin end that are disposed at an interval. The first external pin end is electrically connected to the first internal pin end. The first external pin end is configured to electrically connect to an external device of the variable aperture. The variable aperture further includes a first circuit board. The first circuit board is fastened to a main part. The first circuit board is electrically connected to the first internal pin end. The piezoelectric ceramic is fastened to the first circuit board, and is electrically connected to the first circuit board. It may be understood that the variable aperture has relatively high integrity. An electrical connection manner between the piezoelectric ceramic and the external device of the variable aperture is simple.

In an implementation, quantities of the first internal pin ends and the first external pin ends are both two. The two first internal pin ends are electrically connected to the two first external pin ends in a one-to-one correspondence. The two first internal pin ends are located on a surface that is of the body part and that is away from the first protrusion part.

The body part is further provided with a first side hole and a second side hole that are disposed at an interval. One first internal pin end is located on a periphery of the first side hole. The other first internal pin end is located on a periphery of the second side hole.

The first circuit board includes a main part and a first extension part and a second extension part that are disposed opposite to each other. The main part is connected between the first extension part and the second extension part. The piezoelectric ceramic is fastened to the main part, and is electrically connected to the main part. The first extension part passes through the first side hole, and is electrically connected to one of the first internal pin ends. The second extension part passes through the second side hole, and is electrically connected to the other first internal pin end.

In an implementation, the variable aperture further includes an elastic component. The elastic component is fastened to the body part. The first circuit board is fastened to the elastic component. The elastic component is configured to squeeze the first circuit board, so that the piezoelectric ceramic exerts an action force on the rotation ring. It should be understood that a force used by the elastic component to squeeze the first circuit board may be an elastic force of the elastic component. For example, in a process in which the elastic component is assembled on the base, preset deformation is first set for the elastic component. The preset deformation can enable the elastic component to generate a preset elastic force. After the elastic component is assembled on the base, the preset elastic force of the elastic component may squeeze the first circuit board, so that the piezoelectric ceramic exerts the action force on the rotation ring. The force used by the elastic component to squeeze the first circuit board may alternatively be an action force exerted by another component in another part of the variable aperture on the elastic component.

In an implementation, the elastic component includes a first fastening part, a connection part, and a second fastening part that are connected in sequence. The connection part is in an arc shape. The first fastening part is fastened to a side that is of the body part and that is away from the first protrusion part. The second fastening part is located on a side that is of the rotation ring and that is away from the first protrusion part. The first circuit board is fastened to a second circuit board. The first fastening part is provided with a first limiting hole and a second limiting hole that are disposed at an interval. The body part is further provided with a first limiting post and a second limiting post that are disposed at an interval. The first limiting post and the second limiting post are convexly disposed on the surface that is of the body part and that is away from the first protrusion part. The first limiting post is disposed in the first limiting hole, and the second limiting post is disposed in the second limiting hole.

In an implementation, the variable aperture further includes a magnet and a position sensor. The magnet is fastened to the rotation ring. The position sensor is fastened to the body part. The position sensor is configured to detect magnetic field strength obtained when the magnet is at different positions. In this way, an angle at which the rotation ring rotates relative to the base may be determined by using the magnetic field strength detected by the position sensor, to accurately determine a state of the variable aperture, that is, accurately determine the hole diameter of the aperture hole of the variable aperture, thereby accurately controlling a light flux entering the variable aperture.

In an implementation, the body part is provided with a second internal pin end and a second external pin end that are disposed at an interval. The second internal pin end is electrically connected to the second external pin end. The second external pin end is configured to electrically connect to the external device of the variable aperture. The variable aperture further includes the second circuit board. The second circuit board is fastened to the body part, and the second circuit board is electrically connected to the second internal pin end. The position sensor is fastened to the second circuit board and is electrically connected to the second circuit board. It may be understood that the variable aperture has relatively high integrity. An electrical connection manner between the position sensor and the external device of the variable aperture is simple.

In an implementation, the body part has a second protrusion part. The second protrusion part and the first protrusion part are disposed at an interval. The second protrusion part is located on the side that is of the rotation ring and that is away from the first protrusion part. The magnet is disposed opposite to the second protrusion part. The second circuit board is fastened to a surface that is of the second protrusion part and that faces the magnet.

In an implementation, the second circuit board is located between the body part and the magnet, and is fastened to the body part.

In an implementation, the rotation ring includes an annular frame and a first bump. The first bump is convexly disposed on an outer ring surface of the annular frame. The first bump and the annular frame form accommodating space by enclosing. The magnet is disposed in the accommodating space. One side of the magnet is fastened to the annular frame. Another side of the magnet is fastened to the first bump.

In an implementation, the variable aperture further includes a magnetic conductive sheet. The magnetic conductive sheet is fastened to the body part. The magnetic conductive sheet is disposed opposite to the magnet. It may be understood that a magnetic attraction force may be generated between the magnetic conductive sheet and the magnet through fitting between the magnetic conductive sheet and the magnet. In this way, stability of the rotation ring is better, that is, the rotation ring is not prone to problems such as tilting or shaking in a static state or in a rotation process.

In an implementation, the first protrusion part is further provided with a plurality of grooves disposed at an interval. An opening of the groove is located on a peripheral side surface of the first protrusion part. The rotation ring is further provided with an annular groove. The annular groove is formed by inwardly curving an inner ring surface of the annular frame towards the outer ring surface of the annular frame. The variable aperture further includes a plurality of roll balls. The plurality of roll balls are disposed in a one-to-one correspondence with the plurality of grooves. One part of each roll ball is disposed in the groove, and the other part is disposed in the annular groove. The roll ball rotates relative to a groove wall of the groove, and rolls relative to a groove wall of the annular grove. In this way, the rotation ring can be rotationally connected to the base by using the roll ball. A friction force between the rotation ring and the base is relatively small.

In an implementation, each blade includes a first part, a second part, and a third part that are connected in sequence. The first part is rotationally connected to the rotation ring. The second part is slidably connected to the first protrusion part. Third parts of the plurality of blades together form the aperture hole by enclosing.

In an implementation, the first protrusion part is provided with a plurality of first fastening posts disposed at an interval. The rotation ring further has a plurality of second fastening posts disposed at an interval. The first part of each blade is provided with a rotation hole. The plurality of second fastening posts are disposed in a one-to-one correspondence with rotation holes of the plurality of blades. The first fastening post is rotationally connected to a hole wall of the rotation hole. The second part of each blade is provided with a guide hole. The plurality of first fastening posts are disposed in a one-to-one correspondence with guide holes of the plurality of blades. The first fastening post is slidably connected to a hole wall of the guide hole.

It may be understood that, the first fastening post is rotationally connected to the hole wall of the rotation hole, so that a connection manner between the rotation ring and the blade is relatively simple, and mass production is easy to be implemented. The first fastening post is slidably connected to the hole wall of the guide hole, so that a connection manner between the base and the blade is relatively simple, and mass production is easy to be implemented.

According to a second aspect, an embodiment of this application provides a camera module. The camera module includes a lens assembly and the foregoing driving apparatus. The variable aperture of the driving apparatus is fastened to the lens assembly, and is located on a light inlet side of the lens assembly.

It may be understood that the variable aperture in this application is not interfered by external magnetism or a magnetic conductive component. In this way, a size of the aperture hole of the variable aperture in this application can be accurately adjusted, and reliability is better. When the variable aperture is applied to the camera module, reliability of the camera module is also better.

In an implementation, the lens assembly includes a motor and a camera lens. The camera lens is disposed on the motor. The motor is configured to drive the camera lens to move in an optical axis direction of the camera module. The variable aperture is fastened to the camera lens.

In an implementation, the camera module further includes a module circuit board, a photosensitive chip, a support, and a light filter. The photosensitive chip is fastened to the module circuit board, and is electrically connected to the module circuit board. The support is fastened to the module circuit board. The support is provided with a second light transmission hole, and the photosensitive chip is disposed opposite to the second light transmission hole. The light filter is fastened to the second light transmission hole, and the light filter is disposed opposite to the photosensitive chip. The lens assembly is fastened to a side that is of the support and that is away from the module circuit board. The light filter is located on a light-emitting side of the lens assembly.

According to a third aspect, an embodiment of this application provides an electronic device. The electronic device includes a lens assembly and the foregoing driving apparatus. The variable aperture of the driving apparatus is fastened to the lens assembly, and is located on a light inlet side of the lens assembly.

It may be understood that the variable aperture in this application is not interfered by external magnetism or a magnetic conductive component. In this way, a size of the aperture hole of the variable aperture in this application can be accurately adjusted, and reliability is better. When the variable aperture is applied to the electronic device, reliability of the electronic device is also better.

In an implementation, the lens assembly includes a motor and a camera lens. The camera lens is disposed on the motor. The motor is configured to drive the camera lens to move in an optical axis direction of the lens assembly. The variable aperture is fastened to the camera lens and is located on a light inlet side of the camera lens.

In an implementation, the camera module further includes a module circuit board, a photosensitive chip, a support, and a light filter. The photosensitive chip is fastened to the module circuit board, and is electrically connected to the module circuit board. The support is fastened to the module circuit board. The support is provided with a second light transmission hole, and the photosensitive chip is disposed opposite to the second light transmission hole. The light filter is fastened to the second light transmission hole, and the light filter is disposed opposite to the photosensitive chip. The lens assembly is fastened to a side that is of the support and that is away from the module circuit board. The light filter is located on a light-emitting side of the lens assembly.

According to a fourth aspect, an embodiment of this application provides an electronic device. The electronic device includes a lens assembly and a driving apparatus. The driving apparatus includes a variable aperture. The variable aperture is fastened to the lens assembly and is located on a light inlet side of the lens assembly.

The variable aperture includes a base, a rotation ring, a plurality of blades, and a piezoelectric ceramic.

The base includes a body part and a first protrusion part. The bottom of the first protrusion part is fastened to the body part. The base is provided with a first via. The first via penetrates the first protrusion part and the body part.

The rotation ring is sleeved on an outer peripheral side of the first protrusion part, and is rotationally connected to the first protrusion part and/or the body part. It may be understood that the rotation ring may be rotationally connected to the first protrusion part, or the rotation ring may be rotationally connected to the body part, or the rotation ring may be rotationally connected to both the first protrusion part and the body part.

The plurality of blades are located on a side that is of the first protrusion part and that is away from the body part. The plurality of blades are distributed in an annular manner, and together form an aperture hole by enclosing. The aperture hole is disposed opposite to the first via. Each blade is rotationally connected to the rotation ring, and is slidably connected to the first protrusion part.

The piezoelectric ceramic is fastened to the base and is located on an outer side of the rotation ring. The outer side of the rotation ring is a side close to an outer ring surface of the rotation ring. The piezoelectric ceramic is configured to deform under signal control, to drive the rotation ring to rotate relative to the base. Each blade rotates relative to the rotation ring and slides relative to the first protrusion part, and a hole diameter of the aperture hole changes.

It may be understood that, for a conventional variable aperture in which a size of an aperture hole is controlled by using a magnet and a coil, the aperture hole of the conventional variable aperture is likely to change slightly because of an upper limit of magnetic forces of the magnet and the coil. In other words, a change range of the aperture hole of the conventional variable aperture is limited. However, for the variable aperture in this application, the piezoelectric ceramic deforms under signal control, to push the rotation ring to rotate, thereby adjusting a size of the aperture hole. A variation range of the aperture hole of the variable aperture in this application is not affected by magnetic forces of a magnet and a coil.

In addition, the magnet and the coil of the conventional variable aperture are prone to faulty due to interference of external magnetism or a magnetic conductive component. However, the variable aperture in this application is not interfered by external magnetism or a magnetic conductive component. In this way, the variable aperture in this application has better reliability.

Second, the magnet and the coil of the conventional variable aperture increase a width of the conventional variable aperture in a width direction and a length of the conventional variable aperture in a length direction to a large extent. The piezoelectric ceramic in this application also increases a width of the variable aperture in the width direction and a length of the variable aperture in the length direction. However, in this application, the piezoelectric ceramic may flexibly use piezoelectric ceramics of different sizes based on a requirement. In this case, when a piezoelectric ceramic of a relatively small size is selected, both the width of the variable aperture in the width direction and the length of the variable aperture in the length direction can be reduced to a large extent. This facilitates implementation of a miniaturization design of the variable aperture.

In addition, in this application, for the variable aperture, the piezoelectric ceramic drives the rotation ring to rotate, to adjust the size of the aperture hole. The variable aperture in this application has a relatively high response speed.

The variable aperture in this application further has some advantages. Details are as follows.

First, in this application, a structure of the base is improved, so that when the rotation ring is assembled on the base, the rotation ring does not interfere with the first via of the base. Specifically, the base is disposed to include the body part and the first protrusion part, and the bottom of the first protrusion part is fastened to the body part. In addition, the base is provided with the first via. The first via penetrates the body part and the first protrusion part. Then, the rotation ring is sleeved on the outer peripheral side of the first protrusion part, and is rotationally connected to the first protrusion part. In this case, the rotation ring is disposed away from the first via. In this way, when the rotation ring rotates relative to the first protrusion part, the rotation ring does not block the first via due to tilt or vibration.

In addition, in this application, the piezoelectric ceramic is disposed on the outer side of the rotation ring, to prevent the piezoelectric ceramic from interfering with the first via of the base. Specifically, when the piezoelectric ceramic is disposed on the outer side of the rotation ring, the piezoelectric ceramic is disposed away from the first via. In this way, when the rotation ring rotates relative to the first protrusion part, the piezoelectric ceramic does not block the first via due to tilt or vibration.

In addition, the piezoelectric ceramic is disposed on the outer side of the rotation ring, to avoid increasing a thickness of the variable aperture because the piezoelectric ceramic is stacked with the base and the rotation ring, thereby implementing a thin design of the variable aperture. In this way, applying the variable aperture to the electronic device is a better design for an electronic device that has relatively limited internal space and urgently requires a thin form.

In addition, by disposing the piezoelectric ceramic on the outer side of the rotation ring, a forming difficulty of the piezoelectric ceramic can be reduced, thereby implementing mass production. It may be understood that, for a piezoelectric ceramic provided with a hole or a groove, a processing difficulty is relatively high, and mass production is not easy. In this embodiment, the piezoelectric ceramic is disposed on the outer side of the rotation ring, to avoid a structure design in which a structure such as a via or a groove needs to be provided on the piezoelectric ceramic to avoid affecting the first via. In this way, the piezoelectric ceramic has a simple structure and mass production is easy to be implemented.

In addition, by disposing the piezoelectric ceramic on the outer side of the rotation ring, the piezoelectric ceramic does not interfere with the first via, so that the piezoelectric ceramic is not limited in size. Specifically, both a width of the piezoelectric ceramic in the width direction and a length of the piezoelectric ceramic in the length direction in this application can be flexibly designed based on a requirement. In this case, when the piezoelectric ceramic with a relatively small size is used, the width of the variable aperture in the width direction and the length of the variable aperture in the length direction may be greatly reduced, that is, a miniaturization design of the variable aperture is easily implemented. Applying the variable aperture to the electronic device is a better design for the electronic device whose internal space is extremely valuable.

In an implementation, the piezoelectric ceramic is in a strip shape. The piezoelectric ceramic has a simple structure and mass production is easy to be implemented. In addition, it should be understood that, for piezoelectric ceramics of different structures, different signals are used to control deformation of the piezoelectric ceramics. The piezoelectric ceramic of this implementation is in a strip shape, so that the piezoelectric ceramic has a simple structure, which helps reduce design difficulty of a required signal.

In an implementation, the rotation ring includes the outer ring surface. The outer ring surface is a surface that is of the rotation ring and that is away from the first protrusion part. The piezoelectric ceramic contacts the outer ring surface of the rotation ring. It should be understood that, in the width direction or the length direction of the variable aperture, a distance between the piezoelectric ceramic and the rotation ring is relatively short, which is conducive to a narrow design of the variable aperture.

In an implementation, the body part is provided with a first internal pin end and a first external pin end that are disposed at an interval. The first external pin end is electrically connected to the first internal pin end. The first external pin end is configured to electrically connect to an external device of the variable aperture. The variable aperture further includes a first circuit board. The first circuit board is fastened to a main part. The first circuit board is electrically connected to the first internal pin end. The piezoelectric ceramic is fastened to the first circuit board, and is electrically connected to the first circuit board. It may be understood that the variable aperture has relatively high integrity. An electrical connection manner between the piezoelectric ceramic and the external device of the variable aperture is simple.

In an implementation, quantities of the first internal pin ends and the first external pin ends are both two. The two first internal pin ends are electrically connected to the two first external pin ends in a one-to-one correspondence. The two first internal pin ends are located on a surface that is of the body part and that is away from the first protrusion part. The body part is further provided with a first side hole and a second side hole that are disposed at an interval. One first internal pin end is located on a periphery of the first side hole. The other first internal pin end is located on a periphery of the second side hole.

The first circuit board includes a main part and a first extension part and a second extension part that are disposed opposite to each other. The main part is connected between the first extension part and the second extension part. The piezoelectric ceramic is fastened to the main part, and is electrically connected to the main part. The first extension part passes through the first side hole, and is electrically connected to one of the first internal pin ends. The second extension part passes through the second side hole, and is electrically connected to the other first internal pin end.

In an implementation, the variable aperture further includes an elastic component. The elastic component is fastened to the body part. The first circuit board is fastened to the elastic component. The elastic component is configured to squeeze the first circuit board, so that the piezoelectric ceramic exerts an action force on the rotation ring. It should be understood that a force used by the elastic component to squeeze the first circuit board may be an elastic force of the elastic component. For example, in a process in which the elastic component is assembled on the base, preset deformation is first set for the elastic component. The preset deformation may enable the elastic component to generate a preset elastic force. After the elastic component is assembled on the base, the preset elastic force of the elastic component may squeeze the first circuit board, so that the piezoelectric ceramic exerts the action force on the rotation ring. The force used by the elastic component to squeeze the first circuit board may alternatively be an action force exerted by another component in another part of the variable aperture on the elastic component.

In an implementation, the elastic component includes a first fastening part, a connection part, and a second fastening part that are connected in sequence. The connection part is in an arc shape. The first fastening part is fastened to a side that is of the body part and that is away from the first protrusion part. The second fastening part is located on a side that is of the rotation ring and that is away from the first protrusion part. The first circuit board is fastened to a second circuit board. The first fastening part is provided with a first limiting hole and a second limiting hole that are disposed at an interval. The body part is further provided with a first limiting post and a second limiting post that are disposed at an interval. The first limiting post and the second limiting post are convexly disposed on the surface that is of the body part and that is away from the first protrusion part. The first limiting post is disposed in the first limiting hole, and the second limiting post is disposed in the second limiting hole.

In an implementation, the variable aperture further includes a magnet and a position sensor. The magnet is fastened to the rotation ring. The position sensor is fastened to the body part. The position sensor is configured to detect magnetic field strength obtained when the magnet is at different positions. In this way, an angle at which the rotation ring rotates relative to the base may be determined by using the magnetic field strength detected by the position sensor, to accurately determine a state of the variable aperture, that is, accurately determine the hole diameter of the aperture hole of the variable aperture, thereby accurately controlling a light flux entering the variable aperture.

In an implementation, the body part is provided with a second internal pin end and a second external pin end that are disposed at an interval. The second internal pin end is electrically connected to the second external pin end. The second external pin end is configured to electrically connect to the external device of the variable aperture. The variable aperture further includes the second circuit board. The second circuit board is fastened to the body part, and the second circuit board is electrically connected to the second internal pin end. The position sensor is fastened to the second circuit board and is electrically connected to the second circuit board. It may be understood that the variable aperture has relatively high integrity. An electrical connection manner between the position sensor and the external device of the variable aperture is simple.

In an implementation, the body part has a second protrusion part. The second protrusion part and the first protrusion part are disposed at an interval. The second protrusion part is located on the side that is of the rotation ring and that is away from the first protrusion part. The magnet is disposed opposite to the second protrusion part. The second circuit board is fastened to a surface that is of the second protrusion part and that faces the magnet.

In an implementation, the second circuit board is located between the body part and the magnet, and is fastened to the body part.

In an implementation, the rotation ring includes an annular frame and a first bump. The first bump is convexly disposed on an outer ring surface of the annular frame. The first bump and the annular frame form accommodating space by enclosing. The magnet is disposed in the accommodating space. One side of the magnet is fastened to the annular frame. Another side of the magnet is fastened to the first bump.

In an implementation, the variable aperture further includes a magnetic conductive sheet. The magnetic conductive sheet is fastened to the body part. The magnetic conductive sheet is disposed opposite to the magnet. It may be understood that a magnetic attraction force may be generated between the magnetic conductive sheet and the magnet through fitting between the magnetic conductive sheet and the magnet. In this way, stability of the rotation ring is better, that is, the rotation ring is not prone to problems such as tilting or shaking in a static state or in a rotation process.

In an implementation, the first protrusion part is further provided with a plurality of grooves disposed at an interval. An opening of the groove is located on a peripheral side surface of the first protrusion part. The rotation ring is further provided with an annular groove. The annular groove is formed by inwardly curving an inner ring surface of the annular frame towards the outer ring surface of the annular frame. The variable aperture further includes a plurality of roll balls. The plurality of roll balls are disposed in a one-to-one correspondence with the plurality of grooves. One part of each roll ball is disposed in the groove, and the other part is disposed in the annular groove. The roll ball rotates relative to a groove wall of the groove, and also rolls relative to a groove wall of the annular grove. In this way, the rotation ring can be rotationally connected to the base by using the roll ball. A friction force between the rotation ring and the base is relatively small.

In an implementation, each blade includes a first part, a second part, and a third part that are connected in sequence. The first part is rotationally connected to the rotation ring. The second part is slidably connected to the first protrusion part. Third parts of the plurality of blades together form the aperture hole by enclosing.

In an implementation, the first protrusion part is provided with a plurality of first fastening posts disposed at an interval. The rotation ring further has a plurality of second fastening posts disposed at an interval. The first part of each blade is provided with a rotation hole. The plurality of second fastening posts are disposed in a one-to-one correspondence with rotation holes of the plurality of blades. The first fastening post is rotationally connected to a hole wall of the rotation hole.

The second part of each blade is provided with a guide hole. The plurality of first fastening posts are disposed in a one-to-one correspondence with guide holes of the plurality of blades. The first fastening post is slidably connected to a hole wall of the guide hole.

It may be understood that, the first fastening post is rotationally connected to the hole wall of the rotation hole, so that a connection manner between the rotation ring and the blade is relatively simple, and mass production is easy to be implemented. The first fastening post is slidably connected to the hole wall of the guide hole, so that a connection manner between the base and the blade is relatively simple, and mass production is easy to be implemented.

In an implementation, the lens assembly includes a motor and a camera lens. The camera lens is disposed on the motor. The motor is configured to drive the camera lens to move in an optical axis direction of the lens assembly. The variable aperture is fastened to the camera lens and is located on a light inlet side of the camera lens.

BRIEF DESCRIPTION OF THE DRAWINGS

To describe the technical solutions in embodiments of this application or in the background, the following briefly describes the accompanying drawings for describing embodiments of this application or the background.

DETAILED DESCRIPTION OF ILLUSTRATIVE EMBODIMENTS

The following describes embodiments of this application with reference to the accompanying drawings in embodiments of this application.

In descriptions of embodiments of this application, it should be noted that, unless otherwise specified and limited, terms "mount" and "connection" shall be understood in a broad sense. For example, "connection" may be a detachable connection, or may be a non-detachable connection, and may be a direct connection, or may be an indirect connection by using an intermediate medium. "Fasten to" means that two ends are connected and a relative position relationship remains unchanged after the connection. "Rotationally connect" means that two ends are connected and can rotate relative to each other after being connected. "Slidably connect" means that two ends are connected and can slide relative to each other after being connected. Orientation terms mentioned in embodiments of this application, for example, "on", "below", "left", "right", "inside", "outside", are merely directions based on the accompanying drawings. Therefore, the orientation terms are used to better and more clearly describe and understand embodiments of this application, instead of indicating or implying that a specified apparatus or element needs to have a specific orientation, and be constructed and operated in the specific orientation. Therefore, this cannot be understood as a limitation on embodiments of this application. "A plurality of" means at least two. A solution A and/or a solution B include/includes three solutions: the solution A, or the solution B, or include both the solution A and the solution B.

Figure 1:
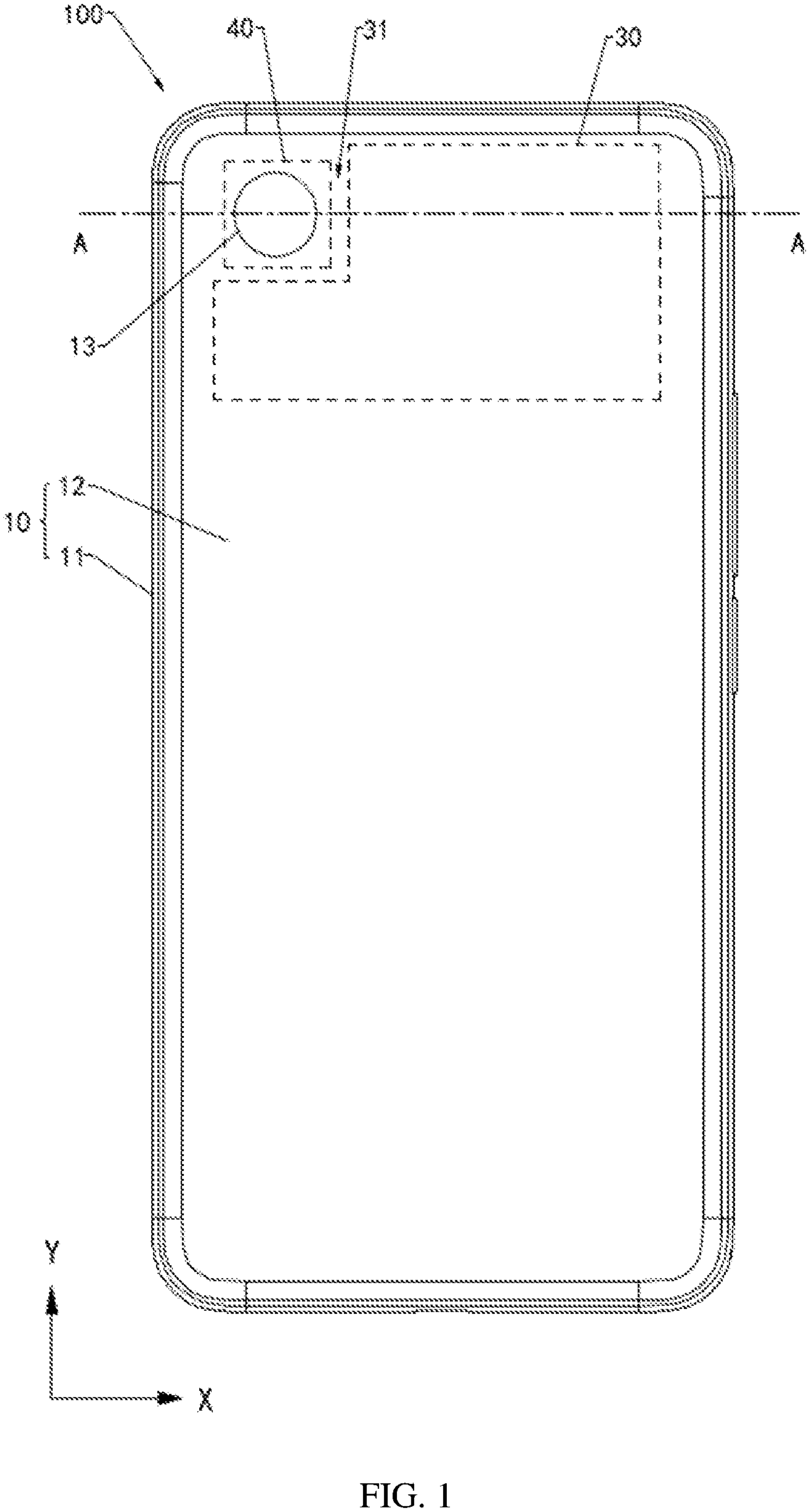
FIG. 1 is a schematic diagram of a structure of an electronic device according to an embodiment of this application.

FIG. 1 is a schematic diagram of a structure of an electronic device 100 according to an embodiment of this application. The electronic device 100 may be a device having a camera module, such as a mobile phone, a tablet personal computer (tablet personal computer), a laptop computer (laptop computer), a personal digital assistant (personal digital assistant, PDA), a camera, a personal computer, a notebook computer, a vehicle-mounted device, a wearable device, augmented reality (augmented reality, AR) glasses, an AR helmet, virtual reality (virtual reality, VR) glasses, or a VR helmet. In the embodiment shown in FIG. 1, descriptions are provided by using an example in which the electronic device 100 is a mobile phone.

Figure 2:
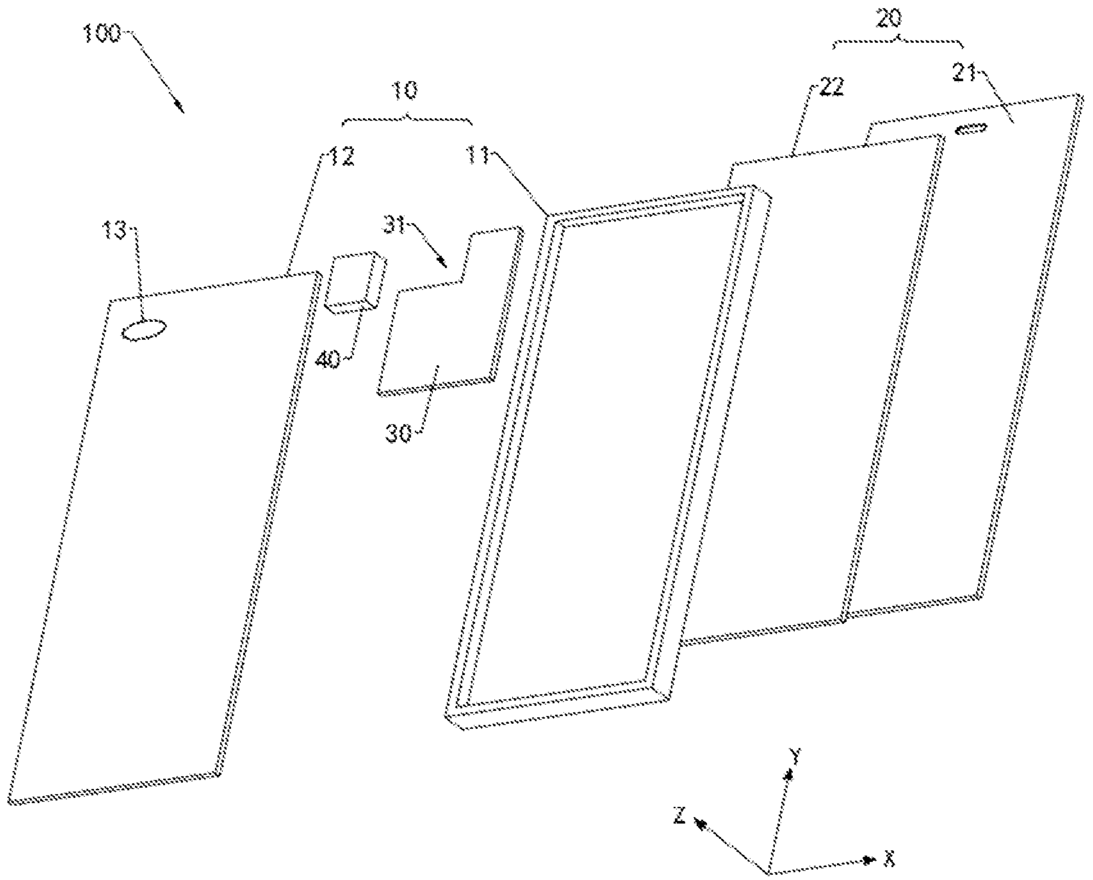
FIG. 2 is a partial schematic exploded view of the electronic device shown in FIG. 1.

With reference to FIG. 1, FIG. 2 is a partial schematic exploded view of the electronic device 100 shown in FIG. 1. The electronic device 100 includes a housing 10, a screen 20, a host circuit board 30, and a camera module 40. It should be noted that FIG. 1, FIG. 2, and the following related accompanying drawings show only some components included in the electronic device 100 as an example. Actual shapes, actual sizes, actual positions, and actual structures of these components are not limited by FIG. 1, FIG. 2, and the following accompanying drawings. In addition, when the electronic device 100 is a device of another form, the electronic device 100 may alternatively not include the screen 20 and the host circuit board 30.

For ease of description, a width direction of the electronic device 100 is defined as an X axis, a length direction of the electronic device 100 is a Y axis, and a thickness direction of the electronic device 100 is a Z axis. It may be understood that a coordinate system of the electronic device 100 may be flexibly set based on a specific actual requirement.

In this embodiment, the housing 10 includes a frame 11 and a rear cover 12. The rear cover 12 is fastened to one side of the frame 11. For example, the rear cover 12 may be fastened to the frame 11 by using adhesive. Alternatively, the rear cover 12 and the frame 11 may be an integrally formed structure, that is, the rear cover 12 and the frame 11 are an integral structure.

In another embodiment, the housing 10 may further include a middle plate (not shown in the figure). The middle plate is connected to an inner surface of the frame 11. The middle plate and the rear cover 12 are disposed opposite to each other at an interval. The middle plate and the frame 11 may be an integrally formed structure.

Refer to FIG. 2. The screen 20 is located on a side that is of the frame 11 and that is away from the rear cover 12. In this case, the screen 20 and the rear cover 12 are separately located on two sides of the frame 11. The screen 20, the frame 11, and the rear cover 12 together form an interior of the electronic device 100 by enclosing. The interior of the electronic device 100 may be configured to place a device of the electronic device 100, for example, a battery, a receiver, a microphone, or the like. The screen 20 may be a planar screen, or may be a curved screen.

Figure 3:
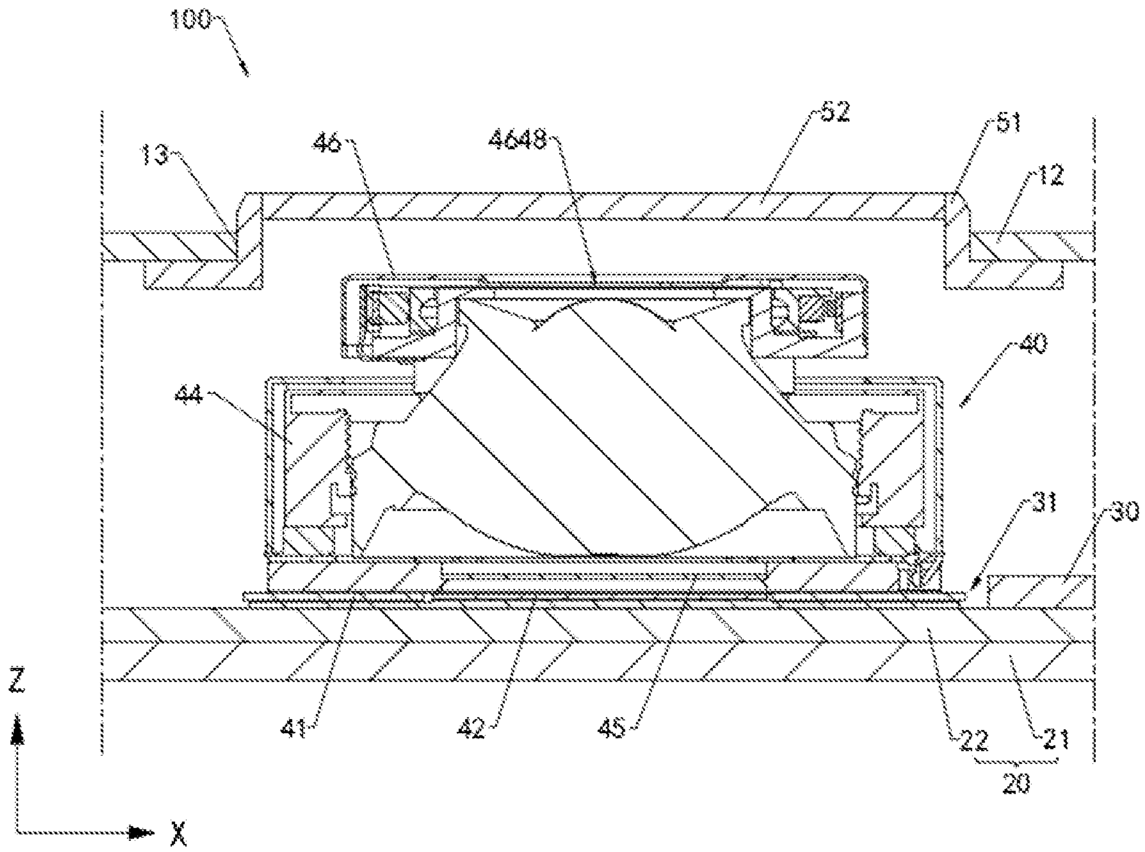
FIG. 3 is a partial schematic sectional diagram of the electronic device shown in FIG. 1 at a line A-A.

With reference to FIG. 2, FIG. 3 is a partial schematic sectional diagram of the electronic device 100 shown in FIG. 1 at a line A-A. The screen 20 includes a first cover plate 21 and a display 22. The first cover plate 21 is stacked on the display 22. The first cover plate 21 is located on a side that is of the display 22 and that is away from the rear cover 12. The first cover plate 21 may be mainly configured to protect the display 22 and prevent dust. A material of the first cover plate 21 may be but is not limited to glass. The display 22 may be an organic light-emitting diode (organic light-emitting diode, OLED) display, an active-matrix organic light-emitting diode (active-matrix organic light-emitting diode, AMOLED) display, a quantum dot light-emitting diode (quantum dot light-emitting diode, QLED) display, or the like.

In addition, the host circuit board 30 is fastened to the interior of the electronic device 100. Specifically, the host circuit board 30 may be fastened to a side that is of the display 22 and that faces the rear cover 12. In another embodiment, when the housing 10 includes the middle plate, the host circuit board 30 may be fastened to a surface that is of the middle plate and that faces the rear cover 12.

The host circuit board 30 may be a hard circuit board, may be a flexible circuit board, or may be a combination of a hard circuit board and a flexible circuit board. The host circuit board 30 may be an FR-4 dielectric board, may be a Rogers (Rogers) dielectric board, or may be a hybrid dielectric board of FR-4 and Rogers, or the like. Herein, FR-4 is a grade designation for a flame-resistant material, and the Rogers dielectric board is a high frequency board. The host circuit board 30 may be configured to place a chip. For example, the chip may be a central processing unit (central processing unit, CPU), a graphics processing unit (graphics processing unit, GPU), a universal flash storage (universal flash storage, UFS), or the like.

In addition, the host circuit board 30 is provided with avoidance space 31. A shape of the avoidance space 31 is not limited to the rectangular shape shown in FIG. 1 and FIG. 2. In another embodiment, the host circuit board 30 may alternatively not be provided with the avoidance space 31.

Refer to FIG. 3. The camera module 40 is located in the interior of the electronic device 100. The camera module 40 is fastened to the side that is of the display 22 and that faces the rear cover 12. In another embodiment, when the housing 10 includes the middle plate, the camera module 40 may be fastened to the surface that is of the middle plate and that faces the rear cover 12.

In addition, a part of the camera module 40 is located in the avoidance space 31 of the host circuit board 30. In this way, in the Z-axis direction, the camera module 40 and the host circuit board 30 have an overlapping area, to avoid a case in which a thickness of the electronic device 100 in the Z-axis direction is increased because the camera module 40 is stacked on the host circuit board 30. In another embodiment, when the host circuit board 30 is not provided with the avoidance space 31, the camera module 40 may be stacked on the host circuit board 30.

In addition, the camera module 40 is further electrically connected to the host circuit board 30. In this way, the camera module 40 may receive a signal from the host circuit board 30, and may also send a signal to the host circuit board 30.

Refer to FIG. 3. The rear cover 12 is provided with a first light transmission hole 13. A shape of the first light transmission hole 13 is not limited to the circle shown in FIG. 1 and FIG. 2. The interior of the electronic device 100 communicates with an exterior of the electronic device 100 through the first light transmission hole 13. In addition, the electronic device 100 further includes a camera decoration part 51 and a second cover plate 52. The second cover plate 52 is fastened to an inner surface of the camera decoration part 51. A part of the camera decoration part 51 may be fastened to an inner surface of the rear cover 12. A part of the camera decoration part 51 contacts a hole wall of the first light transmission hole 13. The camera decoration part 51 and the second cover plate 52 may separate the interior of the electronic device 100 from the exterior of the electronic device 100. Through fitting between the camera decoration part 51 and the second cover plate 52, external water or dust can be prevented from entering the electronic device 100 through the first light transmission hole 13. In addition, a material of the second cover plate 52 is a transparent material, for example, glass or plastic. Ambient light outside the electronic device 100 can pass through the second cover plate 52 and enter the electronic device 100. The camera module 40 collects ambient light that enters the electronic device 100.

In this embodiment, an optical axis direction of the camera module 40 is the Z-axis direction. The camera module 40 may collect ambient light transmitted in the Z-axis direction. In another embodiment, the camera module 40 may alternatively be a periscope camera module. An optical axis direction of the periscope camera module may be any direction on an XY plane.

In another embodiment, the electronic device 100 may not be provided with the first light transmission hole 13, and the camera decoration part 51 and the second cover plate 52 may not be provided. The camera module 40 may directly collect ambient light passing through the rear cover 12. Specifically, a material of the rear cover 12 is a transparent material, for example, glass or plastic. A part of a surface that is of the rear cover 12 and that faces the interior of the electronic device 100 is coated with ink, and the rest of the surface is not coated with ink. In this case, an area that is not coated with ink forms a light transmission area. When ambient light enters the electronic device 100 through the light transmission area, the camera module 40 collects the ambient light.

Figure 4:
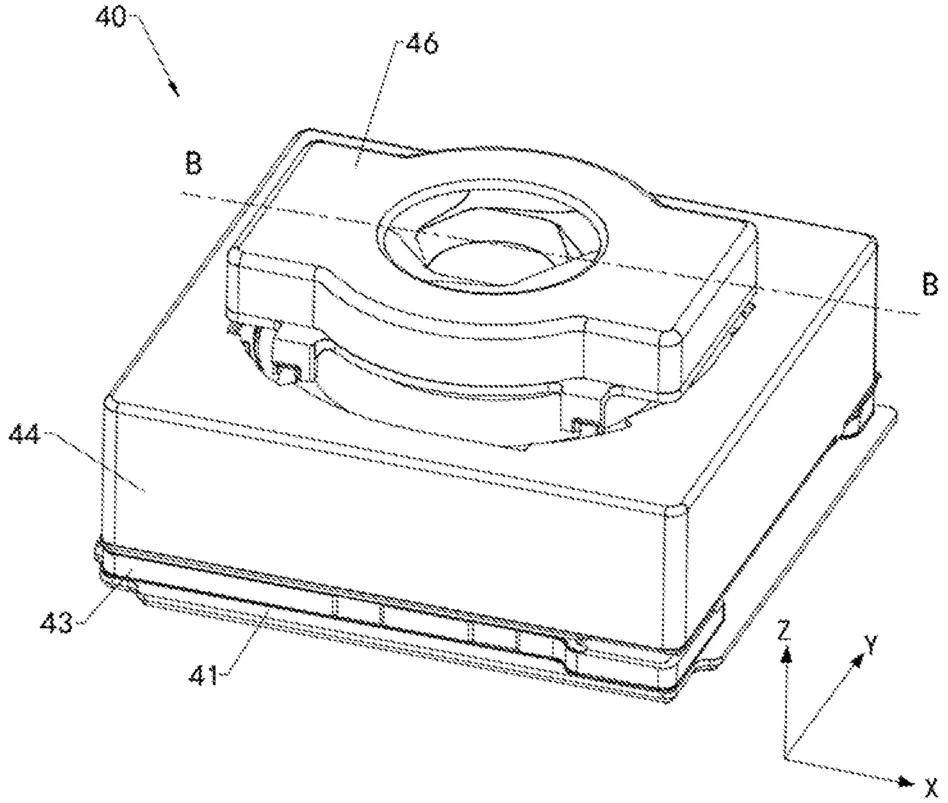
FIG. 4 is a schematic diagram of a structure of a camera module of the electronic device shown in FIG. 1.
Figure 5:
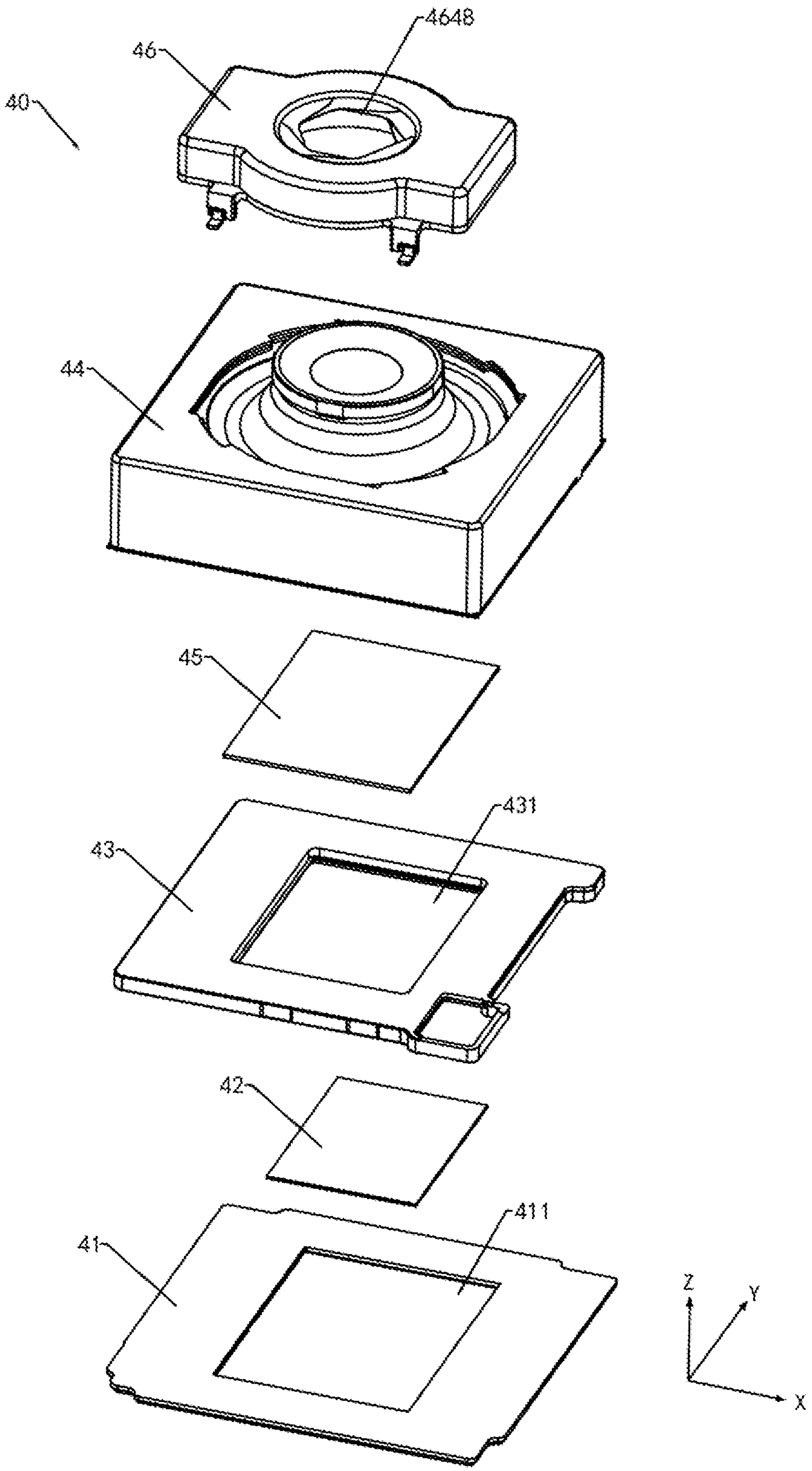
FIG. 5 is a partial schematic exploded view of the camera module shown in FIG. 4.

Refer to FIG. 4 and FIG. 5. FIG. 4 is a schematic diagram of a structure of the camera module 40 of the electronic device 100 shown in FIG. 1. FIG. 5 is a partial schematic exploded view of the camera module 40 shown in FIG. 4. The camera module 40 includes a module circuit board 41, a photosensitive chip 42, a support 43, a lens assembly 44, a light filter 45, and a variable aperture 46. The photosensitive chip 42 may also be referred to as an image sensor, or may be referred to as a photosensitive element. The photosensitive chip 42 may be configured to collect ambient light, and convert image information carried in the ambient light into an electrical signal.

The module circuit board 41 may be a hard circuit board, may be a flexible circuit board, or may be a combination of a hard circuit board and a flexible circuit board. The module circuit board 41 may be an FR-4 dielectric board, or may be a Rogers (Rogers) dielectric board, or may be a hybrid dielectric board of Rogers and FR-4, or the like.

In addition, the module circuit board 41 is provided with a groove 411. An opening of the groove 411 is located on a surface of the module circuit board 41. In another embodiment, the module circuit board 41 may alternatively not be provided with the groove 411.

In addition, the module circuit board 41 includes a stiffening plate (not shown in the figure). The stiffening plate may be a steel plate, an aluminum plate, or the like. The stiffening plate can improve overall strength of the module circuit board 41. In another embodiment, the module circuit board 41 may alternatively not include the stiffening plate.

With reference to FIG. 3, the module circuit board 41 is fastened to the side that is of the display 22 and that faces the rear cover 12. The module circuit board 41 is located in the avoidance space 31. The module circuit board 41 may be electrically connected to the host circuit board 30. In this way, a signal can be transmitted between the module circuit board 41 and the host circuit board 30.

Figure 6:
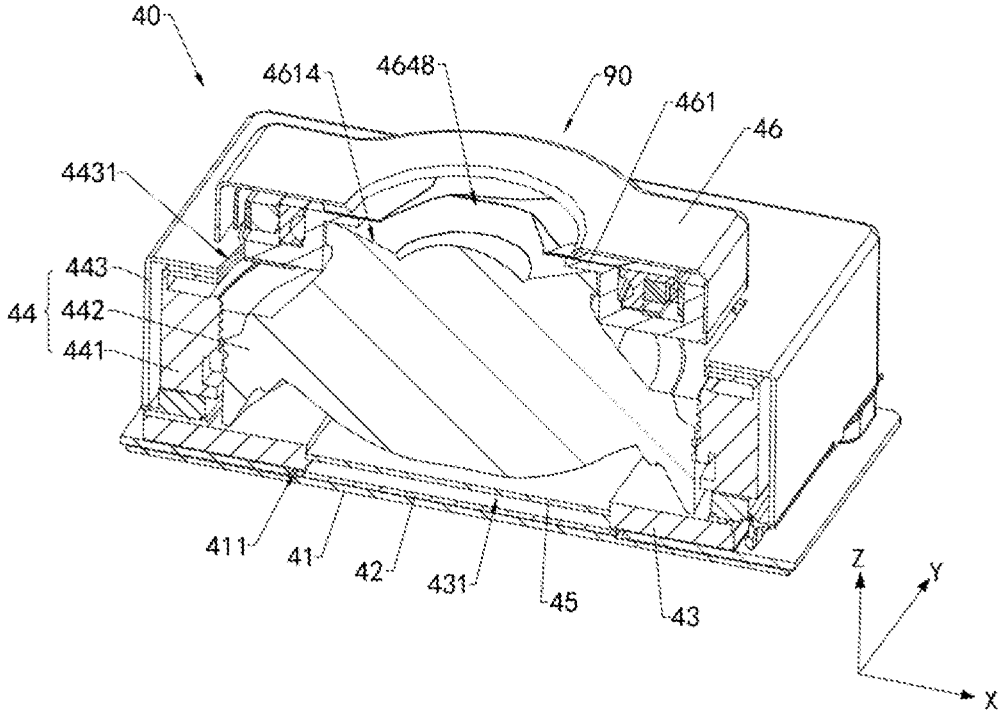
FIG. 6 is a schematic sectional diagram of the camera module shown in FIG. 4 at a line B-B.

With reference to FIG. 5, FIG. 6 is a schematic sectional diagram of the camera module 40 shown in FIG. 4 at a line B-B. The photosensitive chip 42 is fastened to the module circuit board 41 and is located in the groove 411. In this way, the photosensitive chip 42 is disposed in the groove 411, and in the Z-axis direction, the photosensitive chip 42 has an overlapping area with the module circuit board 41, thereby avoiding a case in which a thickness of the camera module 40 in the Z-axis direction is increased because the photosensitive chip 42 is stacked on the module circuit board 41.

In addition, the photosensitive chip 42 is further electrically connected to the module circuit board 41. In this way, the photosensitive chip 42 may receive a signal from the module circuit board 41, and may also send a signal to the module circuit board 41.

In this embodiment, an electronic component (not shown in the figure) or another chip (for example, a driving chip) (not shown in the figure) is further mounted on the module circuit board 41. The electronic component or the another chip is disposed on a periphery of the photosensitive chip 42. The electronic component or the another chip is configured to assist the photosensitive chip 42 in collecting ambient light, and assist the photosensitive chip 42 in processing the collected ambient light.

Refer to FIG. 6. With reference to FIG. 5, the support 43 may be fastened to the module circuit board 41 by using glue, an adhesive tape, or the like. The support 43 and the photosensitive chip 42 are located on a same side of the module circuit board 41.

In addition, the support 43 is provided with a second light transmission hole 431. The second light transmission hole 431 penetrates a surface that is of the support 43 and that faces the module circuit board 41 and a surface that is of the support 43 and that is away from the module circuit board 41. A shape of the second light transmission hole 431 is not limited to the square shown in FIG. 5.

The photosensitive chip 42 is located outside the second light transmission hole 431, and the photosensitive chip 42 is disposed opposite to the second light transmission hole 431. In another embodiment, the photosensitive chip 42 may alternatively be located in the second light transmission hole 431.

Refer to FIG. 6. With reference to FIG. 5, the lens assembly 44 may be fastened to a side that is of the support 43 and that is away from the module circuit board 41 by using glue, an adhesive tape, or the like. In this case, the photosensitive chip 42 is located on a light-emitting side of the lens assembly 44. Ambient light can be imaged to the photosensitive chip 42 through the lens assembly 44 and the second light transmission hole 431 of the support 43.

The lens assembly 44 may be a fixed-focus lens, or may be an auto focus (auto focus, AF) lens, or may be a zoom lens. A specific structure of the lens assembly 44 is not limited. The lens assembly 44 in the embodiment shown in FIG. 5 and FIG. 6 is described by using an AF lens as an example.

Refer to FIG. 6. With reference to FIG. 5, the light filter 45 is fastened to the support 43, and the light filter 45 is located in the second light transmission hole 431. The light filter 45 is located on the light-emitting side of the lens assembly 44, and the light filter 45 is disposed opposite to the photosensitive chip 42. In this case, the light filter 45 is located between the lens assembly 44 and the photosensitive chip 42. For example, the light filter 45 may be fastened to a hole wall of the second light transmission hole 431 by using glue or an adhesive tape.

The light filter 45 may be configured to filter out flare of ambient light passing through the lens assembly 44, to ensure that an image photographed by the camera module 40 has better definition. The light filter 45 may be but is not limited to a blue glass light filter. For example, the light filter 45 may alternatively be a reflective infrared light filter, or a dual-pass light filter (the dual-pass light filter can enable both visible light and infrared light in ambient light to pass through, or enable both visible light and light of another specific wavelength (for example, ultraviolet light) in ambient light to pass through, or enable both infrared light and light of another specific wavelength (for example, ultraviolet light) to pass through).

Refer to FIG. 6. With reference to FIG. 5, the variable aperture 46 is located on a light inlet side of the lens assembly 44, and the variable aperture 46 is fastened to the lens assembly 44. The variable aperture 46 has an aperture hole 4648. A size of the aperture hole 4648 can be automatically adjusted. Ambient light can enter the lens assembly 44 through the aperture hole 4648 of the variable aperture 46. It should be noted that a specific structure of the variable aperture 46 is described in detail below with reference to related accompanying drawings. Details are not described herein again.

The variable aperture 46 may be used to increase or decrease a light flux entering the lens assembly 44. For example, when the electronic device 100 performs photographing in a dark light condition, the size of the aperture hole 4648 of the variable aperture 46 may be increased. In this case, the light flux entering the lens assembly 44 increases. When the electronic device 100 performs photographing in a condition of sufficient light, the size of the aperture hole 4648 of the variable aperture 46 may be reduced. In this case, the light flux entering the lens assembly 44 is reduced.

With reference to FIG. 3, the aperture hole 4648 of the variable aperture 46 is disposed opposite to the second cover plate 52. In this case, when ambient light passes through the second cover plate 52, the ambient light can be imaged to the photosensitive chip 42 through the aperture hole 4648 of the variable aperture 46, the lens assembly 44, and the light filter 45.

Figure 7:
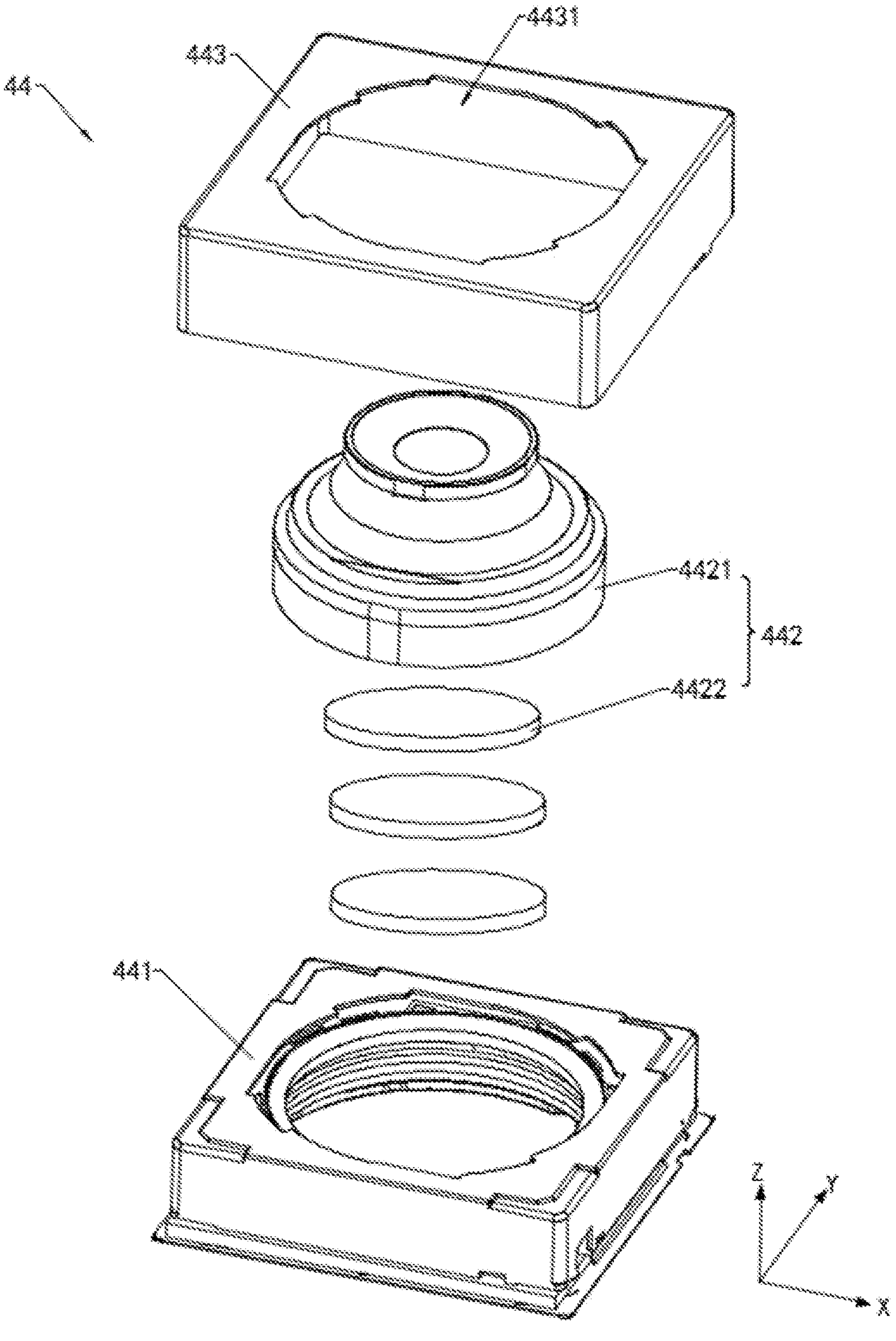
FIG. 7 is a schematic exploded view of a lens assembly of the camera module shown in FIG. 5.

FIG. 7 is a schematic exploded view of the lens assembly 44 of the camera module 40 shown in FIG. 5. The lens assembly 44 includes a motor 441, a camera lens 442, and a lens housing 443.

The motor 441 may be a voice coil motor, or may be a shape memory alloy (shape memory alloy, SMA) motor. It should be understood that a specific structure of the motor 441 is not limited in this application.

The camera lens 442 includes a lens tube 4421 and a lens 4422. A quantity of lenses 4422 is not limited to the three pieces shown in FIG. 7. The lens 4422 is mounted in the lens tube 4421. The lens 4422 may be configured to image ambient light to the photosensitive chip 42 (refer to FIG. 6).

In addition, the lens housing 443 is provided with a connection hole 4431. An interior of the lens housing 443 communicates with an exterior of the lens housing 443 through the connection hole 4431.

Refer to FIG. 6. With reference to FIG. 7, the camera lens 442 is disposed on the motor 441. The motor 441 is configured to drive the camera lens 442 to move in the optical axis direction (that is, the Z-axis direction, where the Z-axis direction includes a Z-axis positive direction and a Z-axis negative direction) of the camera module 40. In addition, the lens housing 443 is fastened to a circumference of the motor 441. A part of the camera lens 442 is located in the interior of the lens housing 443, and a part of the camera lens 442 extends to the exterior of the lens housing 443 through the connection hole 4431 of the lens housing 443. The lens housing 443 can be configured to protect the motor 441 and the camera lens 442.

The variable aperture 46 is fastened to the lens tube 4421 of the camera lens 442, and is located on a light inlet side of the camera lens 442. In this case, ambient light can enter the camera lens 442 through the aperture hole 4648 of the variable aperture 46. It may be understood that when the size of the aperture hole 4648 of the variable aperture 46 and a position of the aperture hole 4648 of the variable aperture 46 relative to the camera lens 442 change, a size of a field of view of the camera lens 442 also changes. In this implementation, the variable aperture 46 is fastened to the camera lens 442, so that when the motor 441 drives the camera lens 442 to move in the Z-axis direction, the variable aperture 46 can also move in the Z-axis direction. In other words, in a process in which the camera lens 442 moves in the Z-axis direction, a position of the variable aperture 46 relative to the camera lens 442 does not change. In this way, when other factors affecting the field of view of the camera lens 442 are not considered, when the position of the aperture hole 4648 of the variable aperture 46 relative to the camera lens 442 remains unchanged, the field of view of the camera lens 442 does not change either.

In another embodiment, the variable aperture 46 may alternatively be fastened to the lens housing 443, or when the connection hole 4431 of the lens housing 443 is large enough, a part of the variable aperture 46 is fastened to the motor 442 through the connection hole 4431. In this way, when the motor 441 drives the camera lens 442 to move in the Z-axis direction, the variable aperture 46 may not move in the Z-axis direction, and the camera lens 442 may move towards or away from the variable aperture 46.

In another embodiment, when the optical assembly 44 is a fixed-focus lens, the optical assembly 44 does not include the motor 441. In this case, the variable aperture 46 may be directly fastened to a light inlet side of the fixed-focus lens.

It should be noted that when the lens assembly 44 includes the motor 441, the variable aperture 46 and the motor 441 form a driving apparatus 90 (refer to FIG. 6). When the lens assembly 44 does not include the motor 441, the variable aperture 46 forms a driving apparatus.

The foregoing specifically describes structures of the electronic device 100 and the camera module 40 with reference to related accompanying drawings. The following specifically describes several structures of the variable aperture 46 with reference to related accompanying drawings.

Figure 8:
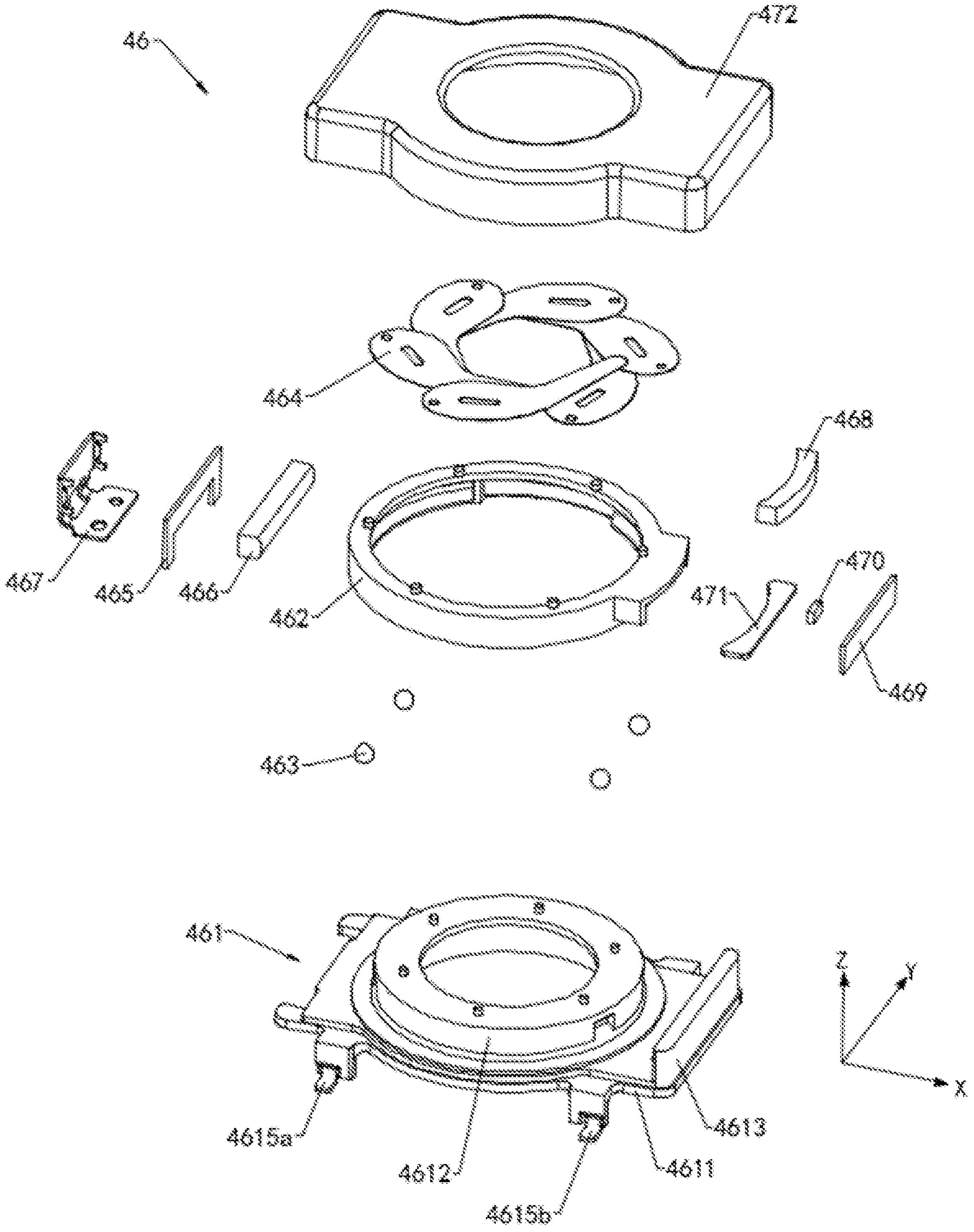
FIG. 8 is a schematic exploded view of a variable aperture of the camera module shown in FIG. 5.

Implementation 1: FIG. 8 is a schematic exploded view of the variable aperture 46 of the camera module 40 shown in FIG. 5. The variable aperture 46 includes a base 461, a rotation ring 462, a plurality of roll balls 463, a plurality of blades 464, a first circuit board 465, a piezoelectric ceramic 466, an elastic component 467, a magnet 468, a second circuit board 469, a position sensor 470, a magnetic conductive sheet 471, and a housing 472. The first circuit board 465, the piezoelectric ceramic 466, and the elastic component 467 may form a driving structure of the variable aperture 46. It should be noted that in this embodiment, a quantity of the roll balls 463 is four. A shape and size of each roll ball 463 are the same. Therefore, each roll ball 463 may use a same number. For brevity of the accompanying drawings, only one of the roll balls is numbered in FIG. 8. In another embodiment, the quantity of roll balls is not limited. The shape and size of each roll ball may be different. A specific shape and size can be flexibly set based on a requirement. In this embodiment, a numbering manner of the plurality of blades 464 is the same as a numbering manner of the plurality of roll balls 463. Details are not described herein again. It should be understood that, when there are a plurality of parts in the following, for a numbering manner of the part, refer to the numbering manner of the plurality of roll balls 463. Details are not described in the following again.

In another embodiment, the variable aperture 46 may alternatively not include the plurality of roll balls 463, the elastic component 467, the magnet 468, the second circuit board 469, the position sensor 470, the magnetic conductive sheet 471, and the housing 472.

Figure 9:
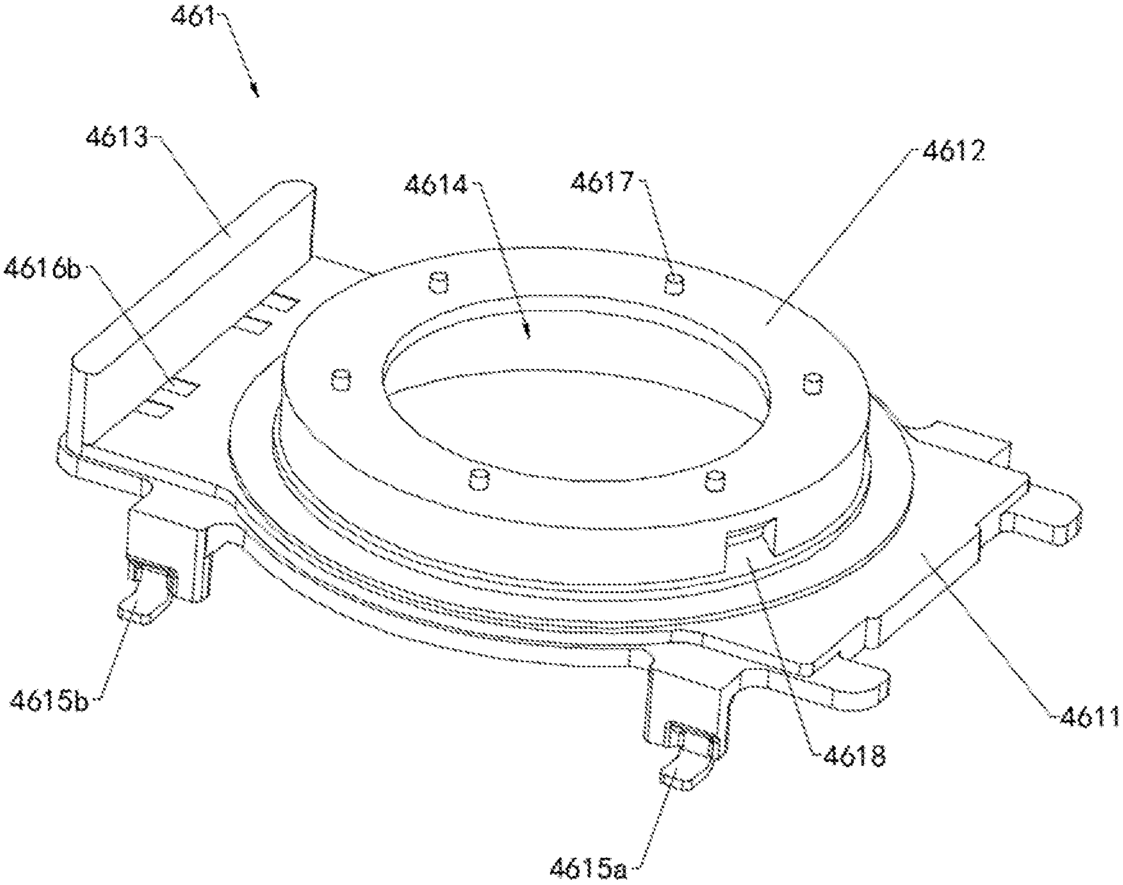
FIG. 9 is a schematic diagram of a structure of a base shown in FIG. 8 from another angle.

With reference to FIG. 8, FIG. 9 is a schematic diagram of a structure of the base 461 shown in FIG. 8 from another angle. The base 461 includes a body part 4611, a first protrusion part 4612, and a second protrusion part 4613. The bottom of the first protrusion part 4612 and the bottom of the second protrusion part 4613 are fastened to the body part 4611 at an interval. The first protrusion part 4612 and the second protrusion part 4613 are located on a same side of the body part 4611. It should be understood that, to facilitate description of a specific structure and shape of the base 461, the base 461 is divided into three parts for description in this embodiment. However, the base 461 is still of an integrally formed structure. In another embodiment, the first protrusion part 4612 and the second protrusion part 4613 may alternatively be fastened to the body part 4611 through soldering or in another manner. In addition, for ease of describing the specific structure and shape of the base 461, the second protrusion part 4613 may also belong to a part of the body part 4611.

The base 461 has a first via 4614. The first via 4614 penetrates a surface that is of the first protrusion part 4612 and that is away from the body part 4611 and a surface that is of the body part 4611 and that is away from the first protrusion part 4612. In other words, the first via 4614 penetrates the body part 4611 and the first protrusion part 4612. In this case, the first protrusion part 4612 may form an annular structure. Space in which the first via 4614 is located is an inner peripheral side of the first protrusion part 4612. A side that is of the first protrusion part 4612 and that is away from the first via 4614 is an outer peripheral side of the first protrusion part 4612.

With reference to FIG. 6, the base 461 is fastened to the camera lens 442 of the lens assembly 44. In this case, when the motor 441 drives the camera lens 442 to move in the Z-axis direction, the variable aperture 46 can also move in the Z-axis direction.

In addition, a part of the camera lens 442 is disposed in the first via 4614 of the base 461. In this way, there is an overlapping area between the variable aperture 46 and the lens assembly 44 in the Z-axis direction. In this case, a thickness of the camera module 40 in the Z-axis direction can be reduced. For example, the camera lens 442 may be in an interference fit with a hole wall of the first via 4614, to improve connection firmness between the variable aperture 46 and the lens assembly 44.

Refer to FIG. 9. With reference to FIG. 8, the body part 4611 is further provided with a plurality of first external pin ends 4615*a* disposed at an interval. The first external pin end 4615*a* may be configured to electrically connect to an external device of the variable aperture 46. For example, the first external pin end 4615*a* may be electrically connected to the motor 441 (refer to FIG. 6) or the module circuit board 41 (refer to FIG. 6) by using a wire or the like. In this embodiment, a quantity of the first external pin ends 4615*a* is two. One first external pin end 4615*a* is shown from the angle in FIG. 8. One first external pin end 4615*a* is shown from the angle in FIG. 9. In another embodiment, the quantity and a position of the first external pin end 4615*a* are not specifically limited.

In addition, the body part 4611 is further provided with a plurality of second external pin ends 4615*b* disposed at an interval. The second external pin end 4615*b* may be configured to electrically connect to the external device of the variable aperture 46. For example, the second external pin end 4615*b* may be electrically connected to the motor 441 (refer to FIG. 6) or the module circuit board 41 (refer to FIG. 6) by using a wire or the like. In this embodiment, a quantity of the second external pin ends 4615*b* is two. One second external pin end 4615*b* is shown from the angle in FIG. 8. One second external pin end 4615*b* is shown from the angle in FIG. 9. In another embodiment, the quantity and a position of the second external pin end 4615*b* are not specifically limited. The two second external pin ends 4615*b* and the two first external pin ends 4615*a* are respectively configured to form different current circuits.

Figure 10:
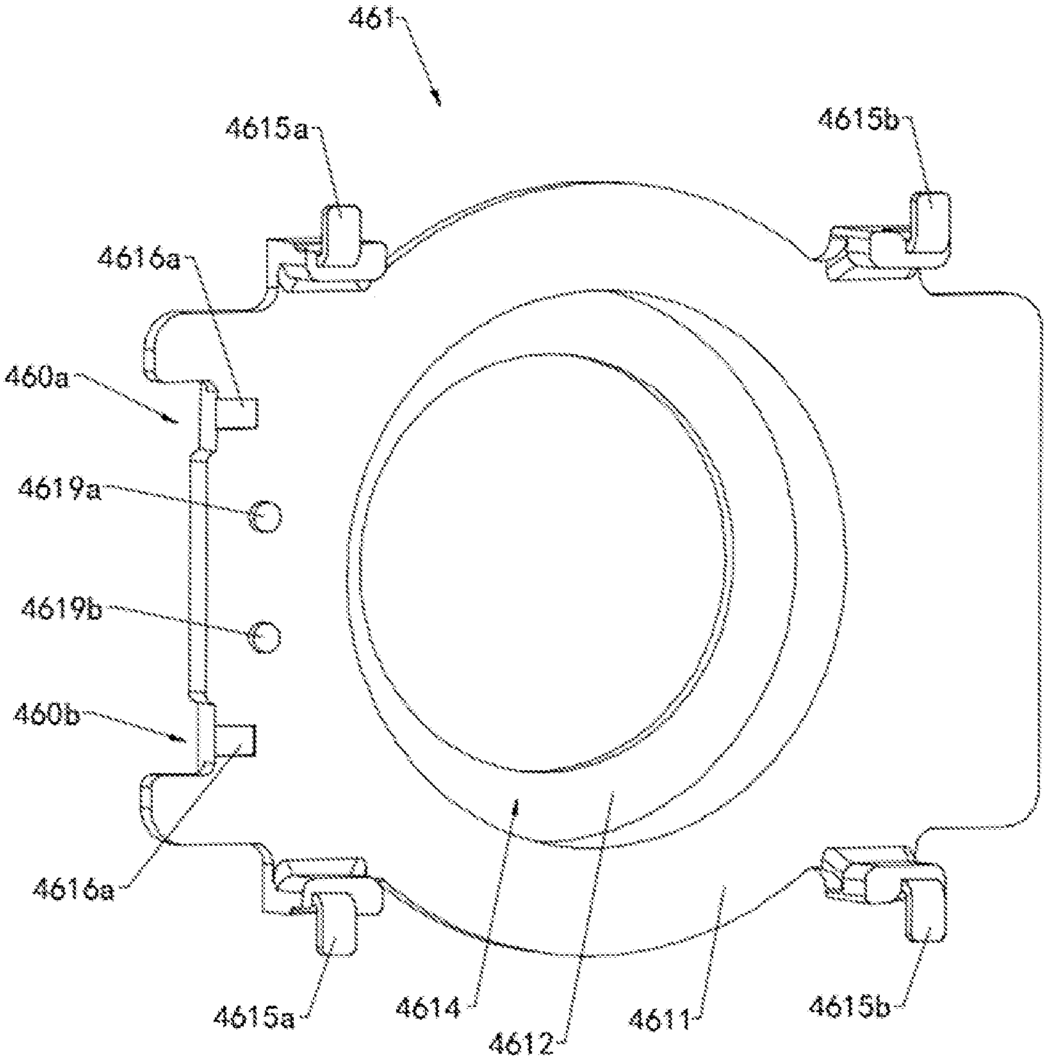
FIG. 10 is a schematic diagram of a structure of a base shown in FIG. 8 from still another angle.

FIG. 10 is a schematic diagram of a structure of the base 461 shown in FIG. 8 from still another angle. The body part 4611 is further provided with a plurality of first internal pin ends 4616*a* disposed at an interval. The first internal pin end 4616*a* is electrically connected to the first external pin end 4615*a*. In addition, the first internal pin end 4616*a* is configured to electrically connect to the first circuit board 465 (refer to FIG. 8) of the variable aperture 46. The following provides specific descriptions with reference to related accompanying drawings. Details are not described herein again. In this embodiment, a quantity of the first internal pin ends 4616*a* is two. The two first internal pin ends 4616*a* are electrically connected to the two first external pin ends 4615*a* in a one-to-one correspondence. The two first internal pin ends 4616*a* are located on the surface that is of the body part 4611 and that is away from the first protrusion part 4612. In another embodiment, the quantity and a position of the first internal pin end 4616*a* are not specifically limited.

In addition, the body part 4611 is further provided with a first side hole 460*a* and a second side hole 460*b* that are disposed at an interval. One of the first internal pin end 4616*a* is located on a periphery of the first side hole 460*a*, and the other first internal pin end 4616*a* is located on a periphery of the second side hole 460*b*.

In addition, the body part 4611 is further provided with a first limiting post 4619*a* and a second limiting post 4619*b* that are disposed at an interval. The first limiting post 4619*a* and the second limiting post 4619*b* are convexly disposed on the surface that is of the body part 4611 and that is away from the first protrusion part 4612. The first limiting post 4619*a* and the second limiting post 4619*b* are located between the two first internal pin ends 4616*a*. In another embodiment, positions of the first limiting post 4619*a* and the second limiting post 4619*b* are not specifically limited.

Refer to FIG. 9. The body part 4611 is further provided with a plurality of second internal pin ends 4616*b* disposed at an interval. The second internal pin end 4616*b* is electrically connected to the second external pin end 4615*b*. The second internal pin end 4616*b* may be configured to electrically connect to the second circuit board 469 (refer to FIG. 8) of the variable aperture 46. The following provides specific descriptions with reference to related accompanying drawings. Details are not described herein again. In this embodiment, a quantity of the second internal pin ends 4616*b* is four. The four first internal pin ends 4616*a* are located on a surface that is of the body part 4611 and that faces the first protrusion part 4612, and are located between the first protrusion part 4612 and the second protrusion part 4613. In another embodiment, the quantity and a position of the second internal pin end 4616*b* are not specifically limited.

Refer to FIG. 9. The first protrusion part 4612 is provided with a plurality of first fastening posts 4617 disposed at an interval. The plurality of first fastening posts 4617 are convexly disposed on a surface that is of the first protrusion part 4612 and that is away from the body part 4611. The plurality of first fastening posts 4617 are disposed around the first via 4614. In this embodiment, a quantity of the first fastening posts 4617 is six. In another embodiment, the quantity of the first fastening posts 4617 is not specifically limited.

In addition, the first protrusion part 4612 is further provided with a plurality of grooves 4618 disposed at an interval. An opening of the groove 4618 is located on a peripheral side surface of the first protrusion part 4612. In this embodiment, a quantity of the grooves 4618 is four. In other words, the quantity of the grooves 4618 is the same as the quantity of the roll balls 463. In another embodiment, the quantity of the grooves 4618 is not specifically limited.

Figure 11:
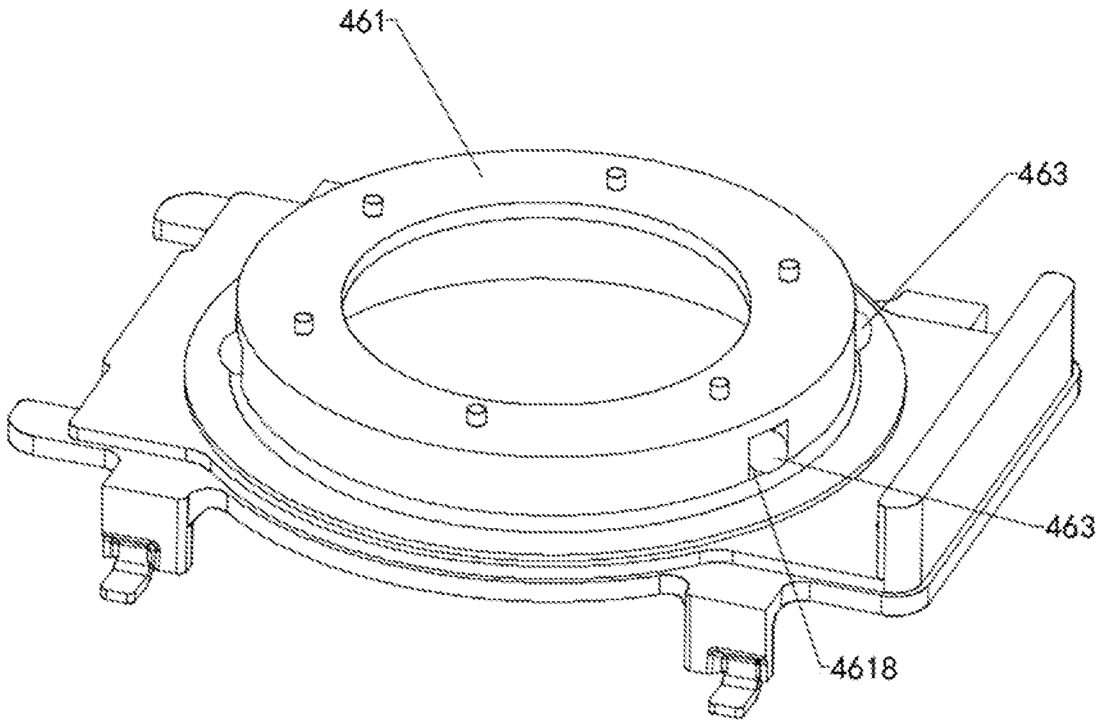
FIG. 11 is a schematic diagram of a partial structure of the variable aperture shown in FIG. 5.

FIG. 11 is a schematic diagram of a partial structure of the variable aperture 46 shown in FIG. 5. The plurality of roll balls 463 are disposed in a one-to-one correspondence with the plurality of grooves 4618. In this embodiment, one of the roll balls 463 is used as an example for description. A part of the roll ball 463 is disposed in the groove 4618 of the base 461. The other part of the roll ball 463 is located outside the groove 4618. In addition, a groove wall of the groove 4618 may limit movement of the roll ball 463, to prevent the roll ball 463 from sliding out of the groove 4618. The roll ball 463 may rotate in any direction relative to the groove wall of the groove 4618.

Figure 12:
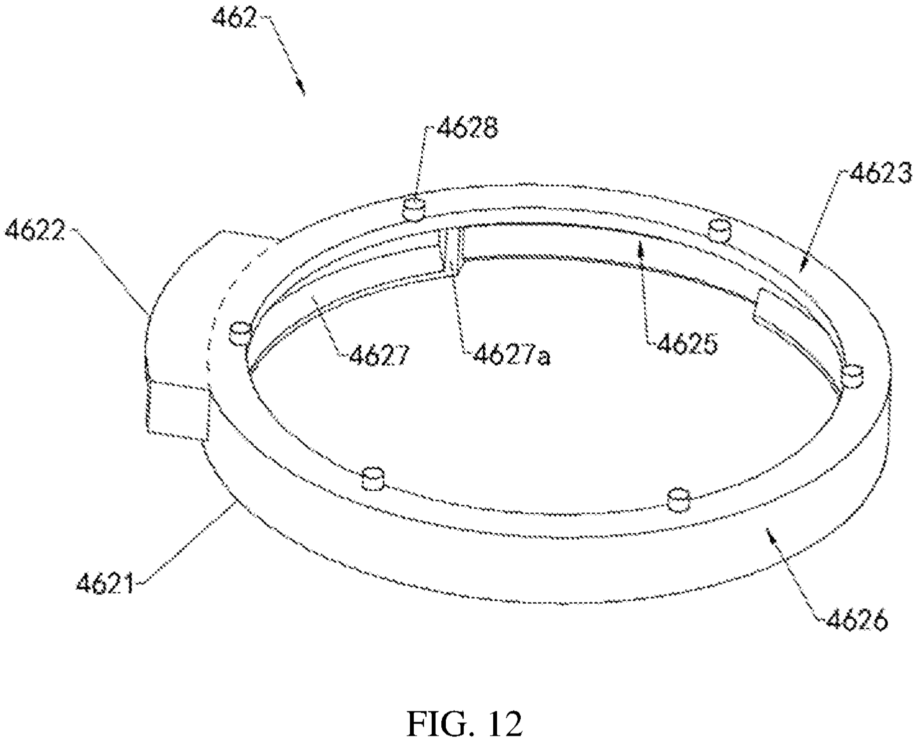
FIG. 12 is a schematic diagram of a structure of a rotation ring shown in FIG. 8 from another angle.
Figure 13:
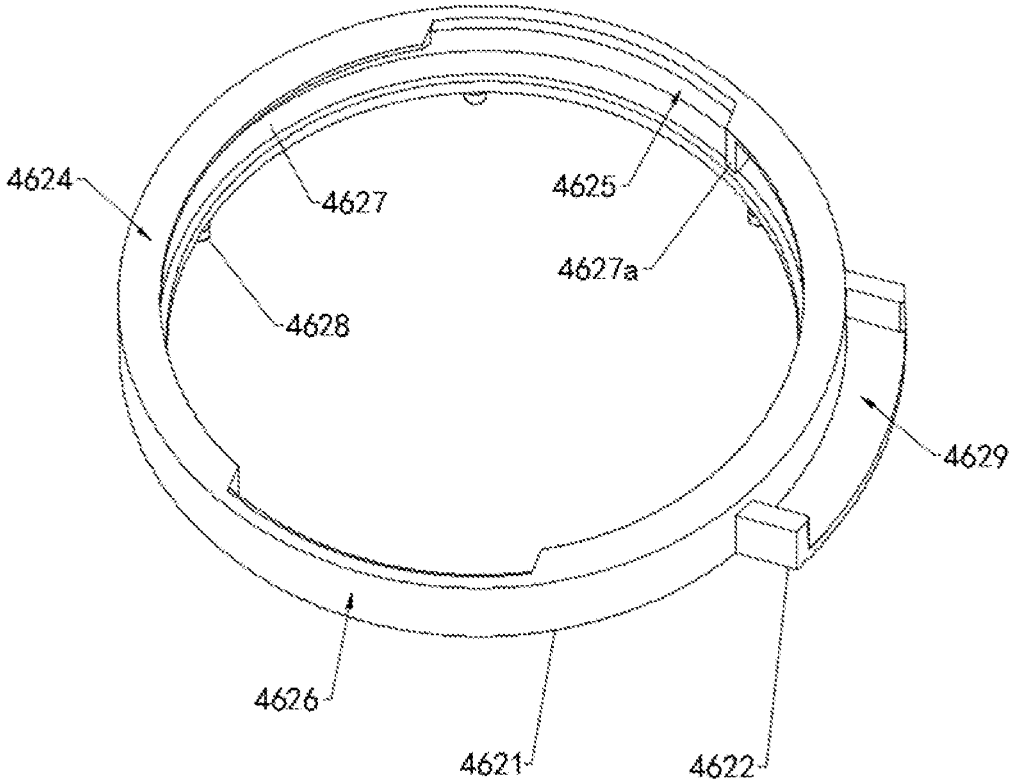
FIG. 13 is a schematic diagram of a structure of a rotation ring shown in FIG. 8 from still another angle.

Refer to FIG. 12 and FIG. 13. FIG. 12 is a schematic diagram of a structure of the rotation ring 462 shown in FIG. 8 from another angle. FIG. 13 is a schematic diagram of the structure of the rotation ring 462 shown in FIG. 8 from still another angle. The rotation ring 462 includes an annular frame 4621 and a first bump 4622. It should be noted that, in order to clearly describe the specific structure of the rotation ring 462, the rotation ring 462 is described in two parts in this embodiment. However, the rotation ring 462 is still of an integrally formed structure. In FIG. 12, the annular frame 4621 and the first bump 4622 are schematically distinguished by using dashed lines. In another embodiment, the first bump 4622 may alternatively be fastened to the annular frame 4621 through soldering or in another manner.

The annular frame 4621 includes an upper end face 4623 and a lower end face 4624 that are disposed back-to-back with each other, and an inner ring surface 4625 and an outer ring surface 4626 that are disposed back-to-back with each other. The upper end face 4623 of the annular frame 4621 and the lower end face 4624 of the annular frame 4621 are connected between the inner ring surface 4625 of the annular frame 4621 and the outer ring surface 4626 of the annular frame 4621.

Refer to FIG. 12 and FIG. 13. The annular frame 4621 is provided with an annular groove 4627. The annular groove 4627 is formed by inwardly curving the inner ring surface 4625 of the annular frame 4621 towards the outer ring surface 4626 of the annular frame 4621. The annular groove 4627 may be provided with a plurality of spacers 4627*a*. The plurality of spacers 4627*a* can divide the annular groove 4627 into a plurality of parts.

In addition, the annular frame 4621 is further provided with a plurality of second fastening posts 4628 disposed at an interval. The plurality of second fastening posts 4628 are convexly disposed on the upper end face 4623 of the annular frame 4621. The plurality of second fastening posts 4628 form a circle. In this embodiment, a quantity of the second fastening posts 4628 is six. In another embodiment, the quantity of the second fastening posts 4628 is not specifically limited.

In addition, the first bump 4622 of the rotation ring 462 is convexly disposed on the outer ring surface 4626 of the annular frame 4621. The first bump 4622 of the rotation ring 462 and the annular frame 4621 of the rotation ring 462 form accommodating space 4629 by enclosing. In this embodiment, the first bump 4622 of the rotation ring 462 is in a "Π" shape. In another embodiment, the first bump 4622 of the rotation ring 462 may alternatively be in an arc shape or another shape.

Figure 14:
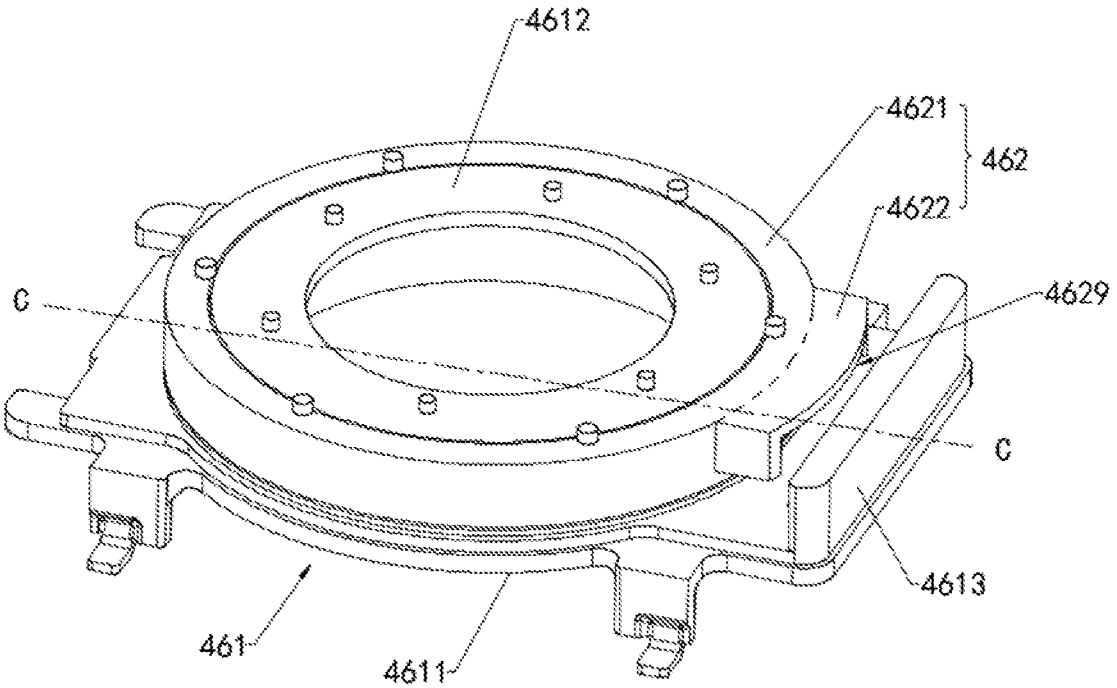
FIG. 14 is a schematic diagram of a partial structure of the variable aperture shown in FIG. 5.

With reference to FIG. 12, FIG. 14 is a schematic diagram of a partial structure of the variable aperture 46 shown in FIG. 5. The annular frame 4621 of the rotation ring 462 is sleeved on the outer peripheral side of the first protrusion part 4612 of the base 461. In addition, the annular frame 4621 of the rotation ring 462 is rotationally connected to the first protrusion part 4612 of the base 461. In this case, the annular frame 4621 of the rotation ring 462 rotates by using the first protrusion part 4612 of the base 461 as a rotation shaft. In addition, the first bump 4622 of the rotation ring 462 may be disposed opposite to the second protrusion part 4613 of the base 461. In this case, the accommodating space 4629 of the rotation ring 462 faces the second protrusion part 4613 of the base 461.

Figure 15:
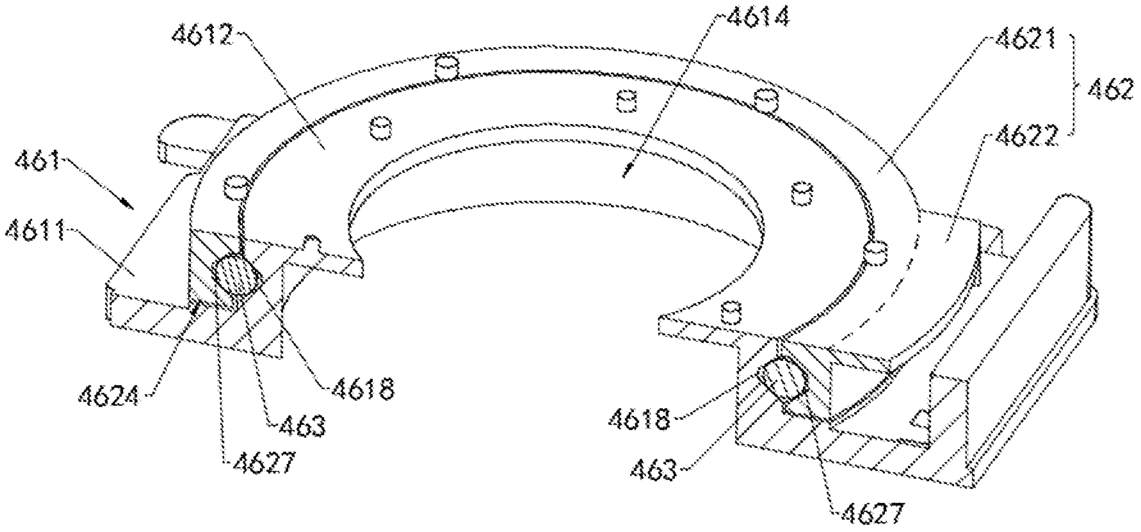
FIG. 15 is a schematic sectional diagram of the part of the variable aperture shown in FIG. 14 at a line C-C.

With reference to FIG. 14, FIG. 15 is a schematic sectional diagram of the part of the variable aperture 46 shown in FIG. 14 at a line C-C. In this embodiment, one of the roll balls 463 is used as an example for description. As mentioned above, a part of the roll ball 463 is disposed in the groove 4618 of the first protrusion part 4612 of the base 461. The other part of the roll ball 463 is located outside the groove 4618. The part of the roll ball 463 located outside the groove 4618 is disposed in the annular groove 4627 of the annular frame 4621. The roll ball 463 can roll within the annular groove 4627, that is, the roll ball 463 is connected to the annular frame 4621 of the rotation ring 462 in a rolling manner. In this way, the rotation ring 462 can be rotationally connected to the base 461 by using the roll ball 463. A friction force between the rotation ring 462 and the base 461 is relatively small.

In addition, the lower end face 4624 of the annular frame 4621 may be disposed at an interval with the body part 4611 of the base 461. In this way, a contact area between the annular frame 4621 and the base 461 is relatively small. The friction force between the annular frame 4621 and the base 461 is further reduced. In another embodiment, the lower end face 4624 of the annular frame 4621 may alternatively contact the body part 4611 of the base 461.

Figure 16:
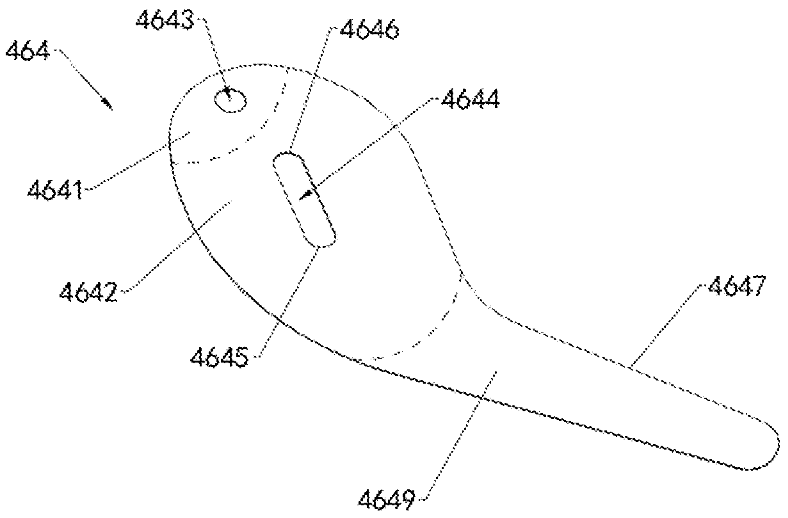
FIG. 16 is a schematic diagram of a structure of a blade shown in FIG. 8 from another angle.

FIG. 16 is a schematic diagram of a structure of the blade 464 shown in FIG. 8 from another angle. In this embodiment, the structure of the blade 464 is specifically described by taking one of the blades 464 as an example. The blade 464 includes a first part 4641, a second part 4642, and a third part 4649 that are connected in sequence. The first part 4641 of the blade 464 is mainly configured to connect to the annular frame 4621 of the rotation ring 462. The second part 4642 of the blade 464 is mainly configured to connect to the first protrusion part 4611 of the base 461. The third part 4649 of the blade 464 is mainly configured to fit the third part of another blade. It should be understood that, for ease of describing the specific structure of the blade 464, in FIG. 16, the first part 4641 of the blade 464, the second part 4642 of the blade 464, and the third part 4649 of the blade 464 are schematically distinguished by using dashed lines. However, the blade 464 is still of an integrally formed structure.

In addition, the first part 4641 of the blade 464 is provided with a rotation hole 4643. For example, the rotation hole 4643 is a round hole.

In addition, the second part 4642 of the blade 464 is provided with a guide hole 4644. For example, the guide hole 4644 is a strip hole. The guide hole 4644 includes a first end wall 4645 and a second end wall 4646 that are disposed opposite to each other. The second end wall 4646 is disposed closer than the first end wall 4645 to the rotation hole 4643.

In this embodiment, the third part 4649 of the blade 464 is in a strip shape. The third part 4649 of the blade 464 includes an inner edge 4647. A shape of the inner edge 4647 may be a straight line, an arc, or partially a straight line and partially an arc. The shape of the inner edge 4647 may alternatively be another irregular shape. In this embodiment, a case in which the shape of the inner edge 4647 is partially a straight line and partially an arc is used as an example.

Figure 17:
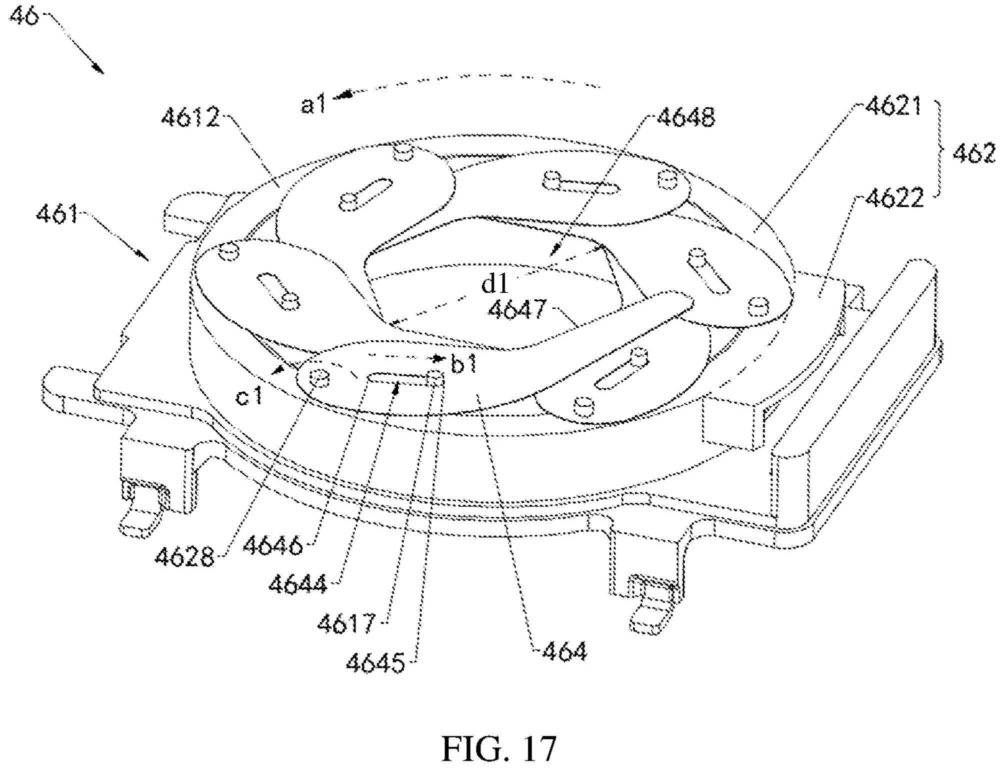
FIG. 17 is a schematic diagram of a partial structure of the variable aperture shown in FIG. 5.

With reference to FIG. 16, FIG. 17 is a schematic diagram of a partial structure of the variable aperture 46 shown in FIG. 5. In this embodiment, a connection relationship between the blade 464, the base 461, and the rotation ring 462 is specifically described by using one blade 464 as an example. The first part 4641 of the blade 464 (refer to FIG. 16) is rotationally connected to the annular frame 4621 of the rotation ring 462. Specifically, one second fastening post 4628 of the rotation ring 462 is disposed in the rotation hole 4643 (refer to FIG. 16) of the blade 464. A hole wall of the rotation hole 4643 may rotate relative to the second fastening post 4628. In this way, through fitting between the rotation hole 4643 and the second fastening post 4628, the blade 464 can rotate relative to the rotation ring 462 by using the second fastening post 4628 as a rotation shaft. It should be understood that, in another embodiment, positions of the second fastening post 4628 and the rotation hole 4643 may be exchanged. The second fastening post 4628 is disposed on the blade 464, and the rotation hole 4643 is disposed on the rotation ring 462.

In addition, the second part 4642 of the blade 464 (refer to FIG. 16) is slidably connected to the first protrusion part 4612 of the base 461. Specifically, one first fastening post 4617 of the base 461 is disposed in the guide hole 4644 of the blade 464. A hole wall of the guide hole 4644 may slide relative to the first fastening post 4617. In this way, through fitting between the guide hole 4644 and the first fastening post 4617, the blade 464 can be slidably connected to the base 461. It should be understood that, in another embodiment, positions of the first fastening post 4617 and the guide hole 4644 may be exchanged. In other words, the first fastening post 4617 is disposed on the blade 464, and the guide hole 4644 is disposed on the base 461.

Refer to FIG. 17. With reference to FIG. 16, the plurality of blades 464 are distributed in an annular manner, and together form the aperture hole 4648 by enclosing. Specifically, the inner edges 4647 of third parts 4649 of the plurality of blades 464 together form the aperture hole 4648 by enclosing. In this embodiment, because the inner edge 4647 is partially a straight line and partially an arc, the aperture hole 4648 is roughly a quasi-hexagon. In another embodiment, when the shape of the inner edge 4647 is another shape, the shape of the aperture hole 4648 may alternatively be another shape. For example, when the shape of the inner edge 4647 is an arc, the shape of the aperture hole 4648 is a circle.

In addition, the aperture hole 4648 is disposed opposite to the first via 4614 (refer to FIG. 15) of the base 461. In this embodiment, a central axis of the aperture hole 4648 coincides with a central axis of the first via 4614. The central axis of the aperture hole 4648 is a virtual axis that passes through a center of the aperture hole 4648 and is perpendicular to a plane in which the aperture hole 4648 is located. For a meaning of the central axis of the first via 4614, refer to a meaning of the central axis of the aperture hole 4648. In another embodiment, the central axis of the aperture hole 4648 may alternatively not coincide with the central axis of the first via 4614.

The foregoing specifically describes a connection relationship between the blade 464, the base 461, and the rotation ring 462. The following specifically describes a relationship between motion of the blade 464 and the size of the aperture hole 4648. In this embodiment, when the rotation ring 462 rotates relative to the base 461, the blade 464 rotates relative to the rotation ring 462, the blade 464 slides relative to the base 461, and the aperture hole 4648 changes. Details are as follows.

Refer to FIG. 17. When the variable aperture 46 is in a first state, the first fastening post 4617 of the base 461 is disposed close to the first end wall 4645 of the guide hole 4644. A maximum hole diameter d1 of the aperture hole 4648 is 6 mm. In another embodiment, the maximum hole diameter d1 of the aperture hole 4648 may alternatively be another value, for example, 0.8 cm or 1.2 cm.

It may be understood that, when the variable aperture 46 is in the first state, a value of the maximum hole diameter d1 of the aperture hole 4648 of the variable aperture 46 is the largest. In this way, a light flux of ambient light entering the variable aperture 46 through the aperture hole 4648 is the largest.

Figure 18:
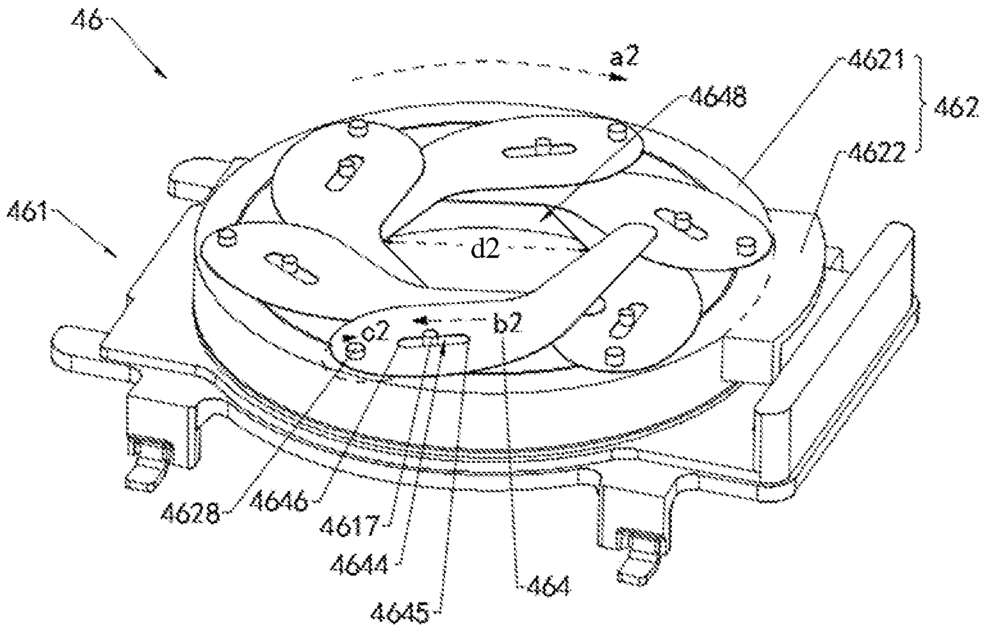
FIG. 18 is a schematic diagram of a structure of the variable aperture shown in FIG. 17 in another state.

FIG. 18 is a schematic diagram of the structure of the variable aperture 46 shown in FIG. 17 in another state. When the variable aperture 46 is in a second state, the first fastening post 4617 of the base 461 is located between the second end wall 4646 of the guide hole 4644 and the first end wall 4645 of the guide hole 4644. A maximum hole diameter d2 of the aperture hole 4648 is 0.5 mm. In another embodiment, the maximum hole diameter d2 of the aperture hole 4648 may alternatively be another value, for example, 1 mm or 3 mm.

It may be understood that, when the variable aperture 46 is in the second state, the maximum hole diameter d1 of the aperture hole 4648 of the variable aperture 46 is greater than the maximum hole diameter d2 of the aperture hole 4648 when the variable aperture 46 is in the first state. In other words, d2 is less than d1. In this way, the light flux of the ambient light entering the variable aperture 46 through the aperture hole 4648 is reduced.

A motion process of the blade 464 is described in detail below with reference to FIG. 17 and FIG. 18. In this embodiment, motion of one of the blades 464 is taken as an example for description.

Refer to FIG. 17. With reference to FIG. 18, when the variable aperture 46 switches from the first state to the second state, and the rotation ring 462 rotates in a first direction a1 (the first direction in this embodiment is the counterclockwise direction) relative to the base 461, the annular frame 4621 of the rotation ring 462 may drive, through the second fastening post 4628, the blade 464 to move. In this case, the blade 464 slides in a third direction b1 (that is, a direction from the second end wall 4646 towards the first end wall 4645) relative to the base 461. In this way, the first fastening post 4617 switches from a state of being close to the first end wall 4645 of the guide hole 4644 to a state of being close to the second end wall 4646 of the guide hole 4644. In addition, the blade 464 rotates in a fifth direction c1 (the fifth direction in this embodiment is the counterclockwise direction) relative to the rotation ring 462 by using the second fastening post 4628 as a rotation shaft.

Refer to FIG. 18. With reference to FIG. 17, when the variable aperture 46 switches from the second state to the first state, and the rotation ring 462 rotates in a second direction a2 (the second direction in this embodiment is the clockwise direction) relative to the base 461, the annular frame 4621 of the rotation ring 462 may drive, through the second fastening post 4628, the blade 464 to move. In this case, the blade 464 slides in a fourth direction b2 (that is, a direction from the first end wall 4645 towards the second end wall 4646) relative to the base 461. In this way, the first fastening post 4617 switches from the state of being close to the second end wall 4646 of the guide hole 4644 to the state of being close to the first end wall 4645 of the guide hole 4644. In addition, the blade 464 rotates in a sixth direction c2 (the sixth direction in this embodiment is the clockwise direction) relative to the rotation ring 462 by using the second fastening post 4628 as a rotation shaft.

The foregoing specifically describes a connection relationship between the base 461, the rotation ring 462, and the blade 464 with reference to the accompanying drawings. The following specifically describes a driving structure of the variable aperture 46 with reference to related accompanying drawings. The driving structure is configured to drive the rotation ring 462 to rotate relative to the base 461. First, the following specifically describes a structure of the driving structure with reference to related accompanying drawings.

Figure 19:
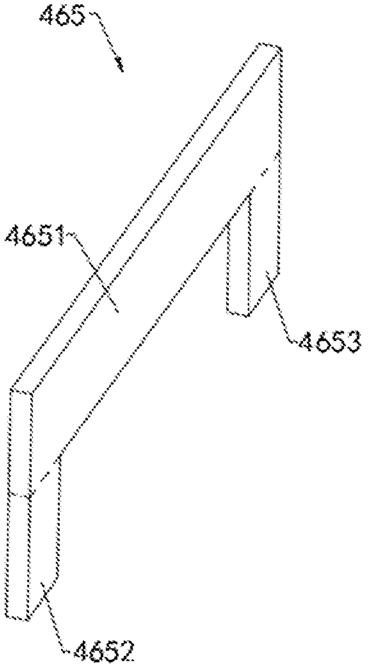
FIG. 19 is an enlarged schematic diagram of a first circuit board shown in FIG. 8.

FIG. 19 is an enlarged schematic diagram of the first circuit board 465 shown in FIG. 8. The first circuit board 465 includes a main part 4651 and a first extension part 4652 and a second extension part 4653 that are disposed opposite to each other. The main part 4651 is connected between the first extension part 4652 and the second extension part 4653. The first extension part 4652 and the second extension part 4653 are located on a same side of the main part 4651. In this case, the first circuit board 465 is approximately in a "H" shape. It should be understood that, to clearly describe a structure and shape of the first circuit board 465, in FIG. 19, the first extension part 4652, the main part 4651, and the second extension part 4653 are schematically distinguished by using dashed lines. However, the first circuit board 465 is still of an integrally formed structure.

It may be understood that, the first circuit board 465 may be a hard circuit board, may be a flexible circuit board, or may be a combination of a hard circuit board and a flexible circuit board.

In another embodiment, the shape of the first circuit board 465 may alternatively be another shape.

In another embodiment, the first circuit board 465 may alternatively not include the first extension part 4652 and the second extension part 4653.

Figure 20:
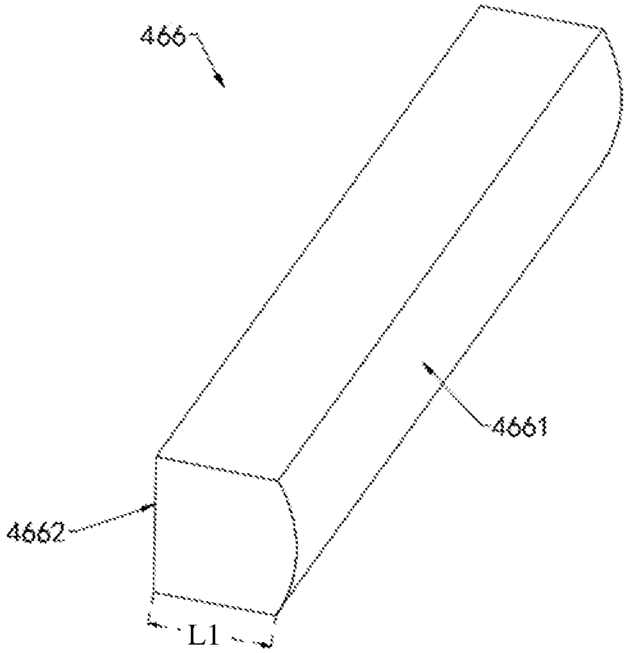
FIG. 20 is an enlarged schematic diagram of a piezoelectric ceramic shown in FIG. 8.

FIG. 20 is an enlarged schematic diagram of the piezoelectric ceramic 466 shown in FIG. 8. The piezoelectric ceramic 466 includes a first surface 4661 and a second surface 4662 that are disposed back-to-back with each other. The first surface 4661 is an arc surface. The second surface 4662 is a plane. The piezoelectric ceramic 466 is in a strip shape. In another embodiment, surface shapes of the first surface 4661 of the piezoelectric ceramic 466 and the second surface 4662 of the piezoelectric ceramic 466 are not specifically limited.

In this embodiment, a vertical distance L1 between the first surface 4661 of the piezoelectric ceramic 466 and the second surface 4662 of the piezoelectric ceramic 466 is within a range of 0.5 millimeters to 4 millimeters. For example, L1=0.5 millimeters, 1 millimeter, 2 millimeters, 3 millimeters, or 4 millimeters. It should be understood that the vertical distance L1 between the first surface 4661 of the piezoelectric ceramic 466 and the second surface 4662 of the piezoelectric ceramic 466 refers to a vertical distance between any point on the first surface 4661 and the second surface 4662. In another embodiment, the vertical distance L1 between the first surface 4661 of the piezoelectric ceramic 466 and the second surface 4662 of the piezoelectric ceramic 466 is not specifically limited. When the L1 is within the range, a width of the piezoelectric ceramic is relatively small, which is conducive to implementing narrow setting of the piezoelectric ceramic 466.

Figure 21:
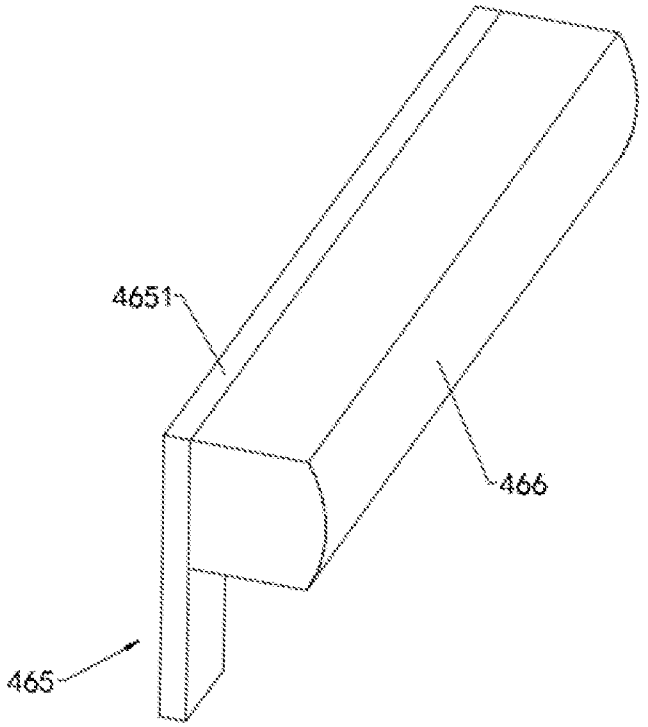
FIG. 21 is a schematic diagram of a partial structure of the variable aperture shown in FIG. 5.

FIG. 21 is a schematic diagram of a partial structure of the variable aperture 46 shown in FIG. 5. The piezoelectric ceramic 466 is fastened to the main part 4651 of the first circuit board 465. The piezoelectric ceramic 466 is electrically connected to the first circuit board 465. The piezoelectric ceramic 466 may be fastened to the main part 4651 of the first circuit board 465 through low-temperature soldering, bonding, or in another manner. The first circuit board 465 may input a pulse width modulation (pulse width modulation, PWM) signal to the piezoelectric ceramic 466, so that the piezoelectric ceramic 466 is configured to deform under signal control.

In another embodiment, the piezoelectric ceramic 466 may alternatively be fastened to another position of the first circuit board 465.

Figure 22:
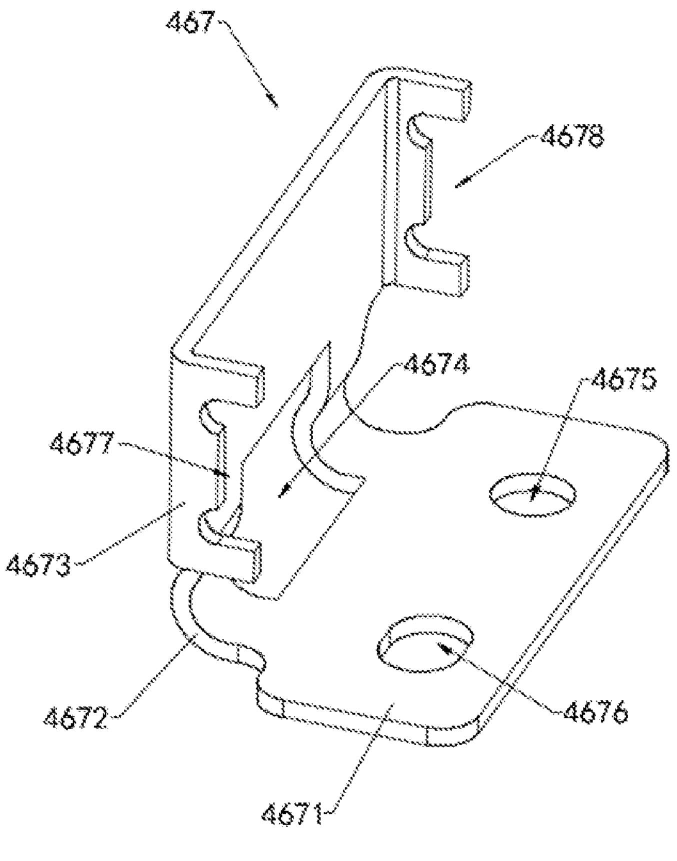
FIG. 22 is an enlarged schematic diagram of an elastic component shown in FIG. 8.

FIG. 22 is an enlarged schematic diagram of the elastic component 467 shown in FIG. 8. The elastic component 467 may be a spring sheet, a spring, an elastic material (for example, elastic rubber), or the like. In this embodiment, the elastic component 467 is described by using a spring sheet as an example. The elastic component 467 includes a first fastening part 4671, a connection part 4672, and a second fastening part 4673 that are connected in sequence.

In this embodiment, the connection part 4672 is in an arc shape, so that an angle of the first fastening part 4671 and the second fastening part 4673 is approximately 90° (a slight deviation is allowed, for example, the angle is 80°, 95°, or 100°). In this way, the first fastening part 4671 can be bent in a direction towards or away from the second fastening part 4673. In addition, the connection part 4672 is provided with a buffer hole 4674. The buffer hole 4674 can reduce hardness of the connection part 4672, that is, improve elasticity of the connection part 4672. In this way, the first fastening part 4671 can be bent more easily in the direction towards or away from the second fastening part 4673.

In addition, the first fastening part 4671 is provided with a first limiting hole 4675 and a second limiting hole 4676 that are disposed at an interval.

In addition, a first notch 4677 and a second notch 4678 are respectively disposed at two ends of the second fastening part 4673.

Figure 23:
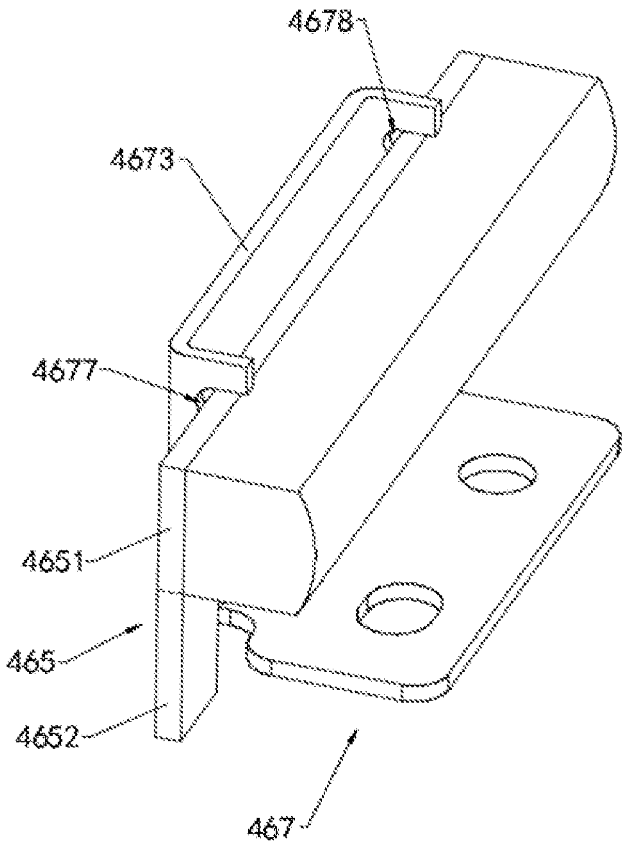
FIG. 23 is a schematic diagram of a partial structure of the variable aperture shown in FIG. 5.

With reference to FIG. 22, FIG. 23 is a schematic diagram of a partial structure of the variable aperture 46 shown in FIG. 5. The first circuit board 465 is fastened to the elastic component 467. Specifically, the first circuit board 465 is fastened to the second fastening part 4673 of the elastic component 467. One end of the main part 4651 of the first circuit board 465 is fastened to the first notch 4677, and the other end of the main part 4651 of the first circuit board 465 is fastened to the second notch 4678. In addition, the first extension part 4652 of the first circuit board 465 is located on a side that is of the first notch 4677 and that is away from the second notch 4678. The second extension part 4653 (refer to FIG. 19) of the first circuit board 465 is located on a side that is of the second notch 4678 and that is away from the first notch 4677.

Figure 24:
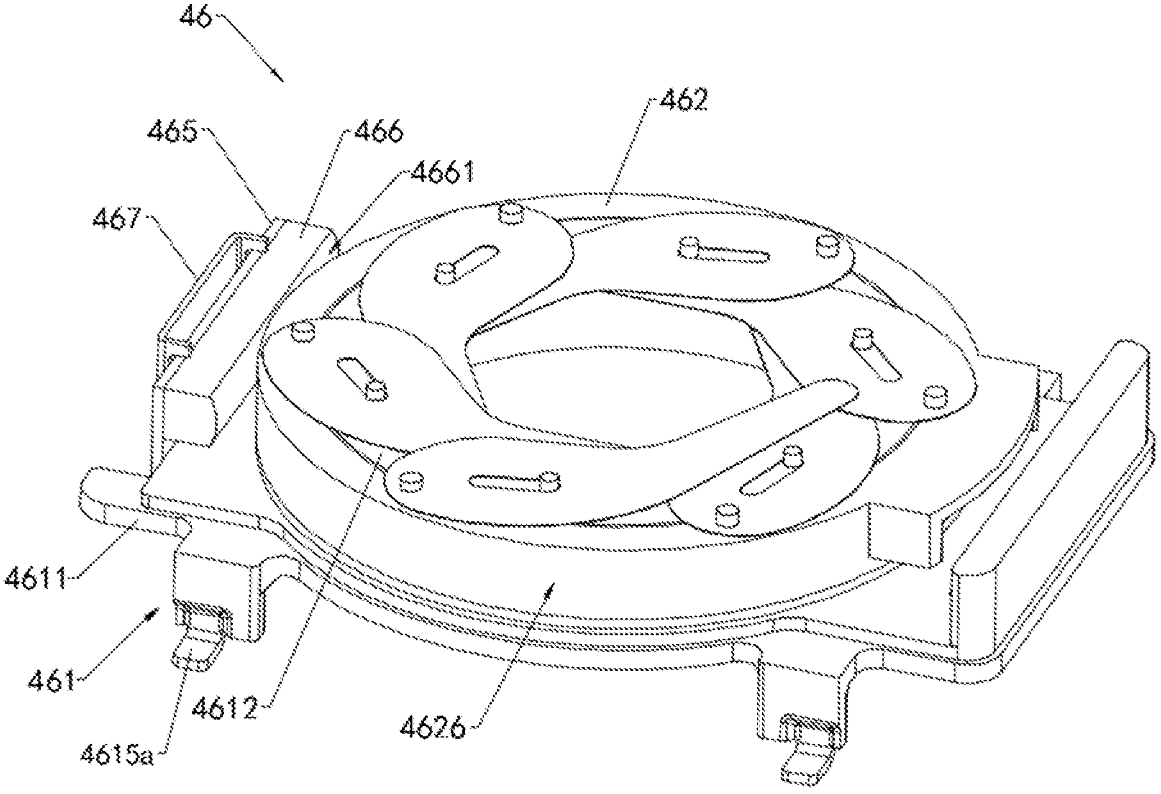
FIG. 24 is a schematic diagram of a partial structure of the variable aperture shown in FIG. 5.

FIG. 24 is a schematic diagram of a partial structure of the variable aperture 46 shown in FIG. 5. The elastic component 467, the first circuit board 465, and the piezoelectric ceramic 466 are located on an outer side of the rotation ring 462. The outer side of the rotation ring 462 refers to a side that is of the rotation ring 462 and that is away from the first protrusion part 4612.

Figure 25:
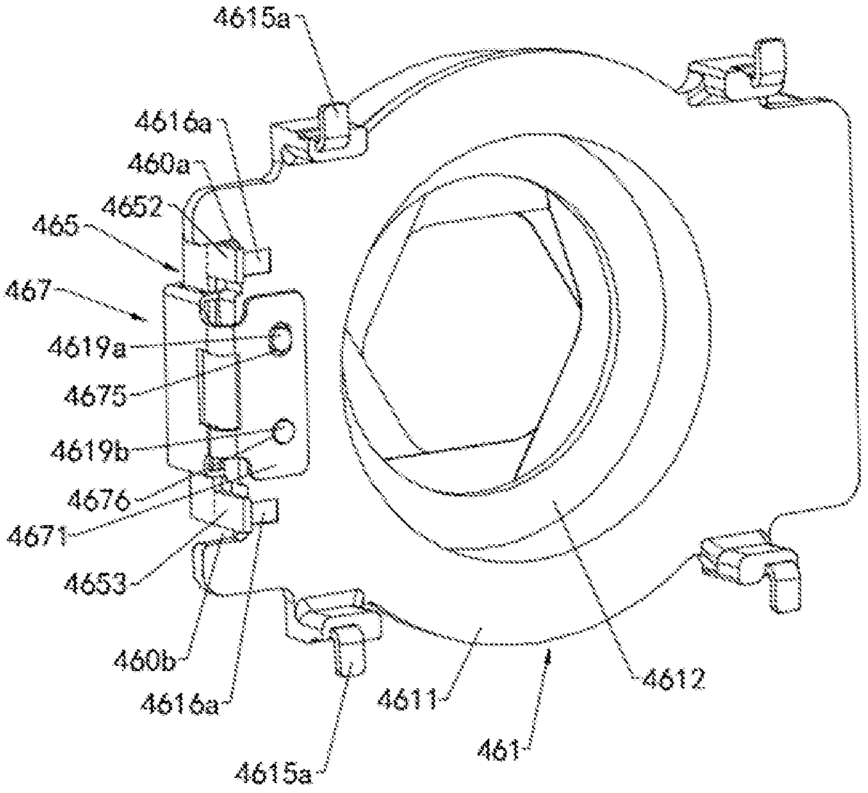
FIG. 25 is a schematic diagram of a structure of the part of the variable aperture shown in FIG. 24 from another angle.

With reference to FIG. 24, FIG. 25 is a schematic diagram of a structure of the variable aperture 46 shown in FIG. 24 from another angle. The elastic component 467 is fastened to the base 461. The first fastening part 4671 of the elastic component 467 is located on a side that is of the body part 4611 of the base 461 and that is away from the first protrusion part 4612. The first limiting post 4619*a* of the base 461 is disposed in the first limiting hole 4675 of the elastic component 467. The first limiting post 4619*a* may be in an interference fit with a hole wall of the first limiting hole 4675. In addition, the second limiting post 4619*b* of the base 461 is disposed in the second limiting hole 4676 of the elastic component 467. The second limiting post 4619*b* may be in an interference fit with a hole wall of the second limiting hole 4676. In this way, through fitting between the first limiting post 4619*a* and the first limiting hole 4675, and fitting between the second limiting post 4619*b* and the second limiting hole 4676, the elastic component 467 is fastened to the base 461. In another embodiment, the base 461 may alternatively be fastened to the base 461 through soldering or in another manner.

In addition, the first extension part 4652 of the first circuit board 465 passes through the first side hole 460*a* of the base 461, and is electrically connected to one of the first internal pin ends 4616*a*. For example, the first extension part 4652 may be fastened to the first internal pin end 4616*a* through soldering or in another manner. In this case, the first circuit board 465 may be fastened to the base 461 and electrically connected to the first internal pin end 4616*a*. In addition, the first extension part 4652 may also be in an interference fit with a hole wall of the first side hole 460*a*, thereby improving connection firmness between the first circuit board 465 and the base 461.

In addition, the second extension part 4653 of the first circuit board 465 passes through the second side hole 460*b* of the base 461, and is electrically connected to the other first internal pin end 4616*a*. For example, the second extension part 4653 may be connected to the first internal pin end 4616*a* through soldering or in another manner. In this case, the first circuit board 465 may be fastened to the base 461 and electrically connected to the first internal pin end 4616*a*. In addition, the second extension part 4653 may also be in an interference fit with a hole wall of the second side hole 460*b* of the base 461, thereby improving connection firmness between the first circuit board 465 and the base 461.

In another embodiment, a shape of the first circuit board 465 is changed, so that the first circuit board 465 is fastened to the first protrusion part 4612.

Refer to FIG. 24 and FIG. 25. When the first extension part 4652 of the first circuit board 465 is electrically connected to one first internal pin end 4616*a*, and the second extension part 4653 of the first circuit board 465 is electrically connected to the other first internal pin end 4616*a*, a part of a current circuit is formed between the first circuit board 465 and the base 461. In addition, it can be learned from the foregoing that the piezoelectric ceramic 466 is electrically connected to the first circuit board 465. The first internal pin end 4616*a* of the base 461 is electrically connected to the first external pin end 4615*a* of the base 461. The first external pin end 4615*a* of the base 461 may also be electrically connected to the external device (for example, the motor 441 shown in FIG. 6, the module circuit board 41 shown in FIG. 6, or the host circuit board 30 shown in FIG. 3) of the variable aperture 46. In this way, the external device of the variable aperture 46, the base 461, the first circuit board 465, and the piezoelectric ceramic 466 form a current circuit. In other words, the external device of the variable aperture 46 may input an electrical signal to the piezoelectric ceramic 466 through the base 461 and the first circuit board 465. The electrical signal may be a first type of PWM signal or a second type of PWM signal. A direction of the second type of PWM signal is different from a direction of the first type of PWM signal.

Figure 26:
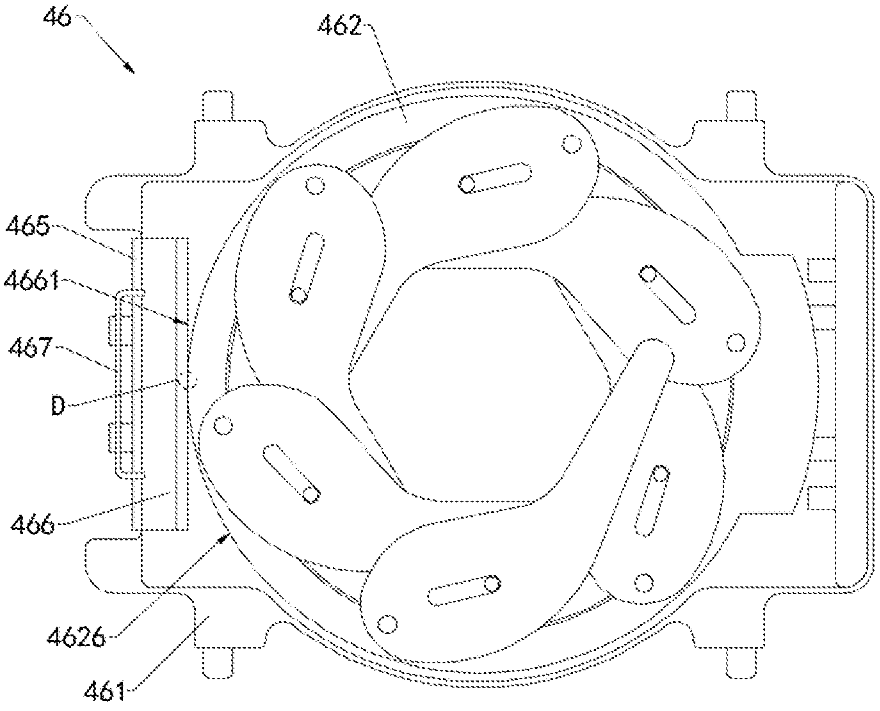
FIG. 26 is a schematic diagram of a structure of the part of the variable aperture shown in FIG. 24 from still another angle.

With reference to FIG. 24, FIG. 26 is a schematic diagram of a structure of the variable aperture 46 shown in FIG. 24 from another angle. The elastic component 467 squeezes the first circuit board 465, so that the first surface 4661 of the piezoelectric ceramic 466 contacts the outer ring surface 4626 of the rotation ring 462, and the piezoelectric ceramic 466 exerts an action force on the outer ring surface 4626 of the rotation ring 462. It should be understood that a force used by the elastic component 467 to squeeze the first circuit board 465 may be an elastic force of the elastic component 467. For example, in a process in which the elastic component 467 is assembled on the base 461, preset deformation is first set for the elastic component 467. The preset deformation may enable the elastic component 467 to generate a preset elastic force. After the elastic component 467 is assembled on the base 461, the preset elastic force of the elastic component 467 may squeeze the first circuit board 465, so that the piezoelectric ceramic 466 exerts the action force on the rotation ring 462. The force used by the elastic component 467 to squeeze the first circuit board 465 may alternatively be an action force exerted by a component in another part of the variable aperture 46 on the elastic component 467, for example, the housing 472 of the variable aperture 46 that is to be mentioned below. For example, after the elastic component 467 is assembled on the base 461, the elastic component 467 deforms under an action force exerted by a component in another part of the variable aperture 46, and the elastic component 467 squeezes the first circuit board 465, so that the piezoelectric ceramic 466 exerts the action force on the rotation ring 462.

The foregoing specifically describes the structure of the driving structure of the variable aperture 46 with reference to related accompanying drawings. The following specifically describes a driving principle of the driving structure with reference to related accompanying drawings.

Figure 27:
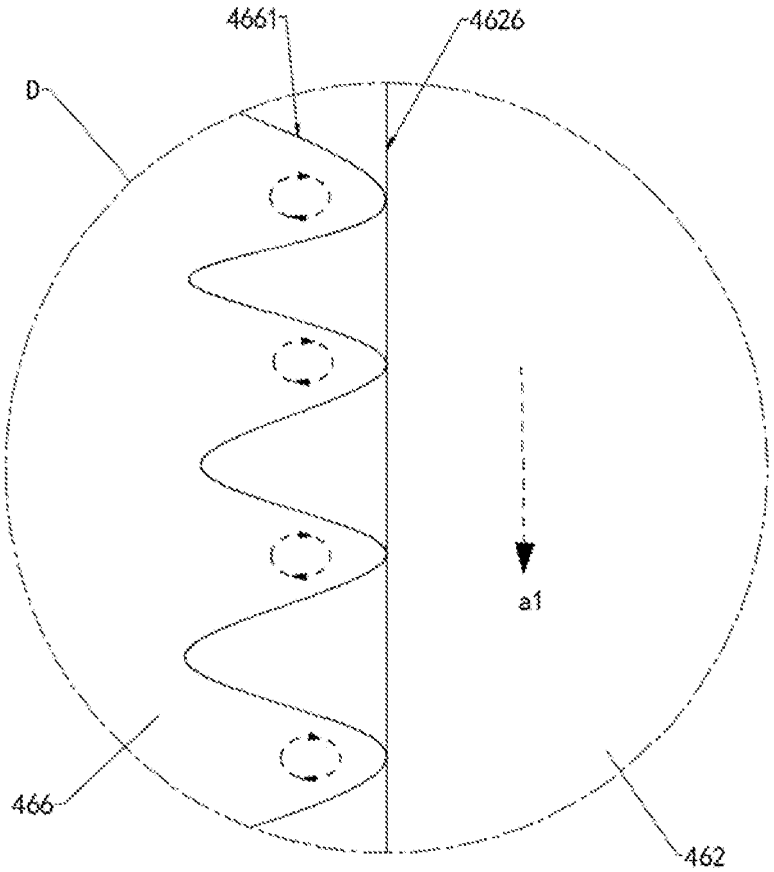
FIG. 27 is an enlarged schematic diagram of the part of variable aperture shown in FIG. 26 at D, where a piezoelectric ceramic inputs a first type of PWM signal.

FIG. 27 is an enlarged schematic diagram of the part of the variable aperture 46 shown in FIG. 26 at D, where the piezoelectric ceramic 466 inputs the first type of PWM signal. When the piezoelectric ceramic 466 inputs the first type of PWM signal, the first surface 4661 of the piezoelectric ceramic 466 generates elliptical vibration in the clockwise direction. The first surface 4661 of the piezoelectric ceramic 466 deforms. In this case, a friction force is generated between the first surface 4661 of the piezoelectric ceramic 466 and the outer ring surface 4626 of the rotation ring 462. The piezoelectric ceramic 466 can drive the rotation ring 462 to rotate in the first direction a1 (that is, the counterclockwise direction).

Figure 28:
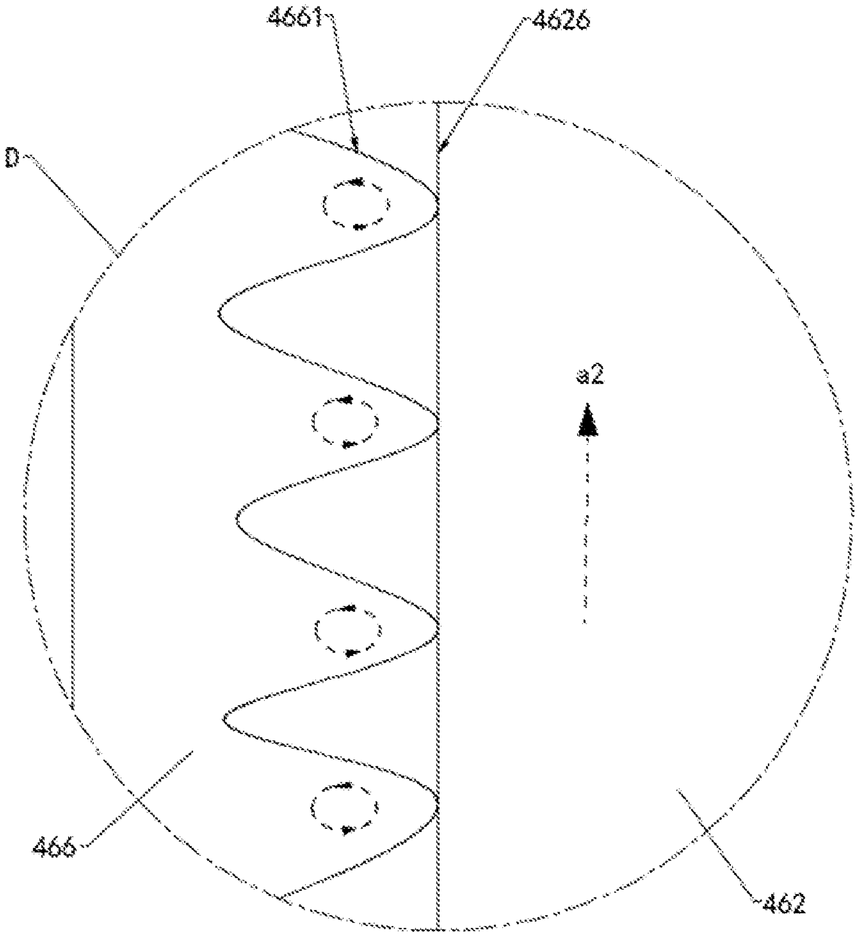
FIG. 28 is an enlarged schematic diagram of the part of variable aperture shown in FIG. 26 at D, where a piezoelectric ceramic inputs a second type of PWM signal.

FIG. 28 is an enlarged schematic diagram of the part of the variable aperture 46 shown in FIG. 26 at D, where the piezoelectric ceramic 466 inputs the second type of PWM signal. When the piezoelectric ceramic 466 inputs the second type of PWM signal, the first surface 4661 of the piezoelectric ceramic 466 generates elliptical vibration in the counterclockwise direction. The first surface 4661 of the piezoelectric ceramic 466 deforms. In this case, a friction force is generated between the first surface 4661 of the piezoelectric ceramic 466 and the outer ring surface 4626 of the rotation ring 462. The piezoelectric ceramic 466 can drive the rotation ring 462 to rotate in the second direction a2 (that is, the clockwise direction).

It may be understood that, in this implementation, the driving principle of the piezoelectric ceramic 466 is specifically described with reference to related accompanying drawings. In another implementation, a manner of driving the rotation ring (462) to rotate relative to the base (461) by using the piezoelectric ceramic (466) and a related principle also fall within the protection scope of this application. Specifically, this is not limited in this implementation.

The foregoing specifically describes the driving structure of the variable aperture 46 with reference to related accompanying drawings. The following specifically describes other components of the variable aperture 46 with reference to related accompanying drawings.

Figure 29:
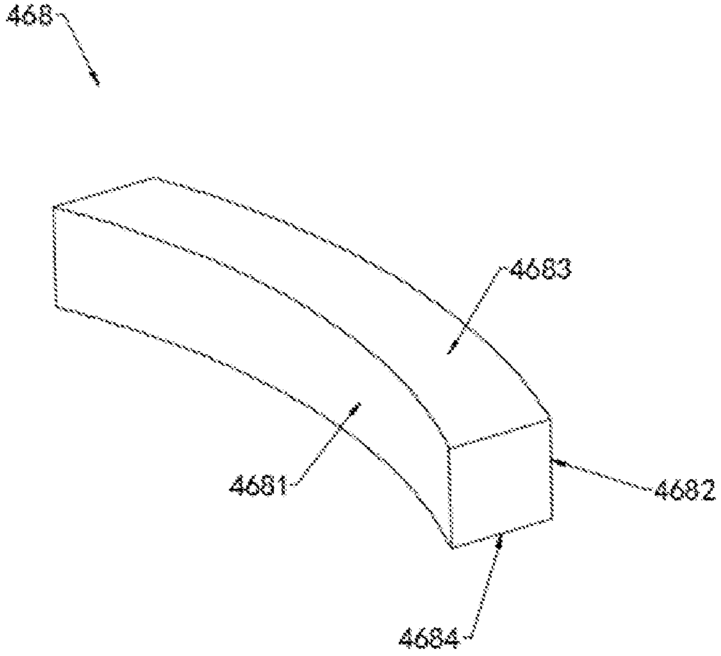
FIG. 29 is a schematic diagram of a structure of a magnet shown in FIG. 8 from another angle.

FIG. 29 is a schematic diagram of a structure of the magnet 468 shown in FIG. 8 from another angle. The magnet 468 includes an inner surface 4681 and an outer surface 4682 that are disposed back-to-back with each other, and an upper surface 4683 and a lower surface 4684 that are disposed back-to-back with each other. The upper surface 4683 and the lower surface 4684 are connected between the inner surface 4681 and the outer surface 4682. In this embodiment, both the outer surface 4682 of the magnet 468 and the inner surface 4681 of the magnet 468 are arc surfaces. Both the upper surface 4683 of the magnet 468 and the lower surface 4684 of the magnet 468 are planes. In another embodiment, surface shapes of the inner surface 4681 of the magnet 468, the outer surface 4682 of the magnet 468, the upper surface 4683 of the magnet 468, and the lower surface 4684 of the magnet 468 are not specifically limited.

Figure 30:
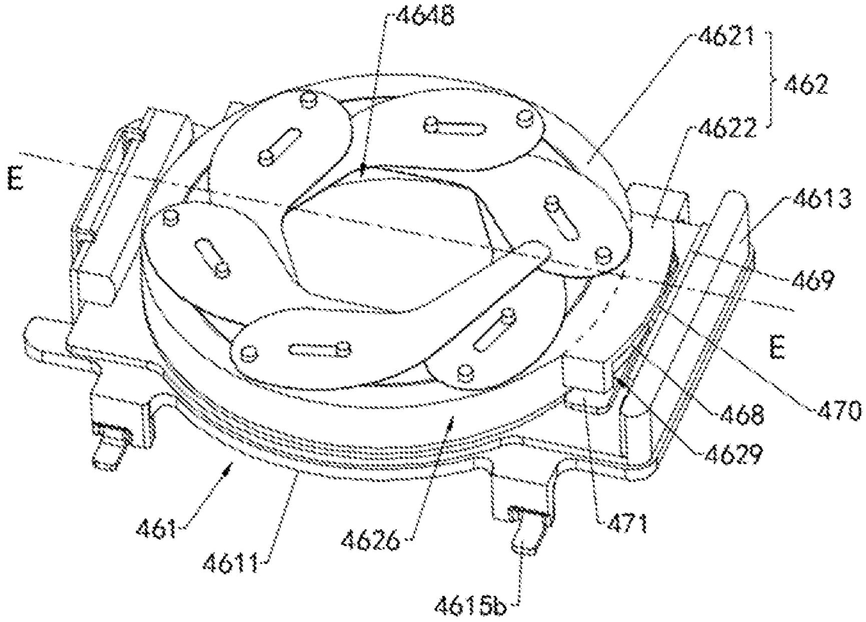
FIG. 30 is a schematic diagram of a partial structure of the variable aperture shown in FIG. 5.
Figure 31:
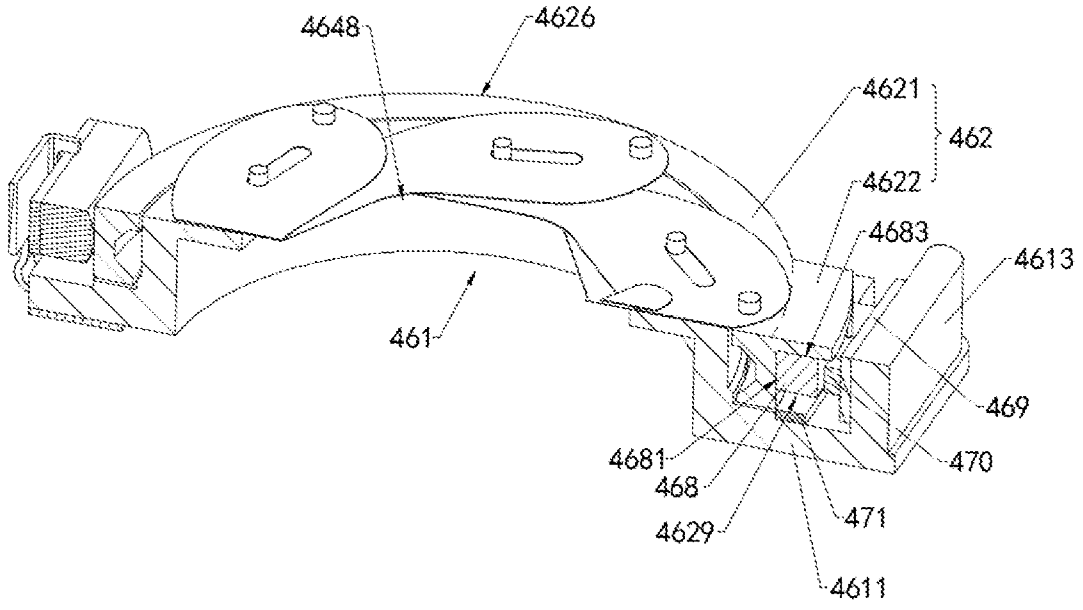
FIG. 31 is a schematic sectional diagram of the part of the variable aperture shown in FIG. 30 at a line E-E.

Refer to FIG. 30 and FIG. 31. With reference to FIG. 29, FIG. 30 is a schematic diagram of a partial structure of the variable aperture 46 shown in FIG. 5. FIG. 31 is a schematic sectional diagram of the part of the variable aperture 46 shown in FIG. 30 at a line E-E. The magnet 468 is fastened to the rotation ring 462, and the magnet 468 is located in the accommodating space 4629 of the rotation ring 462. Specifically, the upper surface 4683 of the magnet 468 may be fastened to the first bump 4622 of the rotation ring 462 by using glue or an adhesive tape. The inner surface 4681 of the magnet 468 may be fastened to the annular frame 4621 of the rotation ring 462 by using glue or an adhesive tape. In this way, connection firmness between the magnet 468 and the rotation ring 462 is increased. In addition, the inner surface 4681 of the magnet 468 is set as an arc surface, so that a shape of the inner surface 4681 of the magnet 468 adapts to a shape of the outer ring surface 4626 of the rotation ring 462. In this way, a connection area between the magnet 468 and the rotation ring 462 is increased, so that the connection firmness between the magnet 468 and the rotation ring 462 is increased.

Refer to FIG. 30 and FIG. 31. The second circuit board 469 is fastened to a surface that is of the second protrusion part 4613 of the base 461 and that faces the magnet 468. The second circuit board 469 is electrically connected to a second internal pin end 4616*b* (refer to FIG. 9) close to the second protrusion part 4613. The second circuit board 469 may be a hard circuit board, may be a flexible circuit board, or may be a combination of a hard circuit board and a flexible circuit board.

In addition, the position sensor 470 is fastened to a side that is of the second circuit board 469 and that faces the magnet 468. The position sensor 470 is electrically connected to the second circuit board 469. The position sensor 470 in this embodiment is described by using a Hall effect sensor as an example. It may be understood that, it can be learned from the foregoing description that the second internal pin end 4616*b* of the base 461 is electrically connected to the second external pin end 4615*b* of the base 461. The second external pin end 4615*b* of the base 461 may also be electrically connected to the external device (for example, the motor 441 shown in FIG. 6, the module circuit board 41 shown in FIG. 6, or the host circuit board 30 shown in FIG. 3) of the variable aperture 46. In this way, when the position sensor 470 is electrically connected to the second circuit board 469, and the second circuit board 469 is electrically connected to the second internal pin end 4616*b*, the position sensor 470, the second circuit board 469, the base 461, and the external device of the variable aperture 46 form a current circuit. In other words, the external device of the variable aperture 46 can input an electrical signal to the position sensor 470 through the base 461 and the second circuit board 469.

In this embodiment, the position sensor 470 is configured to detect magnetic field strength of the magnet 468. It may be understood that when the rotation ring 462 rotates relative to the base 461, the magnet 468 also rotates with the rotation ring 462 relative to the base 461. In this case, the magnet 468 may be at different positions. The position sensor 470 can detect magnetic field strength obtained when the magnet 468 is at different positions. In this way, an angle at which the rotation ring 462 rotates relative to the base 461 can be determined by using the magnetic field strength detected by the position sensor 470, to accurately determine a state of the variable aperture 46, that is, accurately determine the hole diameter of the aperture hole 4648 of the variable aperture 46, thereby accurately controlling the light flux entering the variable aperture 46.

In another embodiment, the position sensor 470 may alternatively be another sensor. The position sensor 470 may be configured to detect the angle at which the rotation ring 462 rotates relative to the base 461.

Refer to FIG. 30 and FIG. 31. The magnetic conductive sheet 471 is fastened to the body part 4611 of the base 461. The magnetic conductive sheet 471 is disposed opposite to the magnet 468. The magnetic conductive sheet 471 being disposed opposite to the magnet 468 means that a projection of the magnet 468 on the magnetic conductive sheet 471 partially or completely overlaps with the magnetic conductive sheet 471. In this embodiment, when the rotation ring 462 rotates relative to the base 461, the magnet 468 rotates with the rotation ring 462 relative to the base 461. The magnet 468 at different positions can be disposed opposite to the magnetic conductive sheet 471. It may be understood that a magnetic attraction force can be generated between the magnetic conductive sheet 471 and the magnet 468 through fitting between the magnetic conductive sheet 471 and the magnet 468. In this way, stability of the rotation ring 462 is better, that is, the rotation ring 462 is not prone to problems such as tilting or shaking in a static state or in a rotation process.

Figure 32:
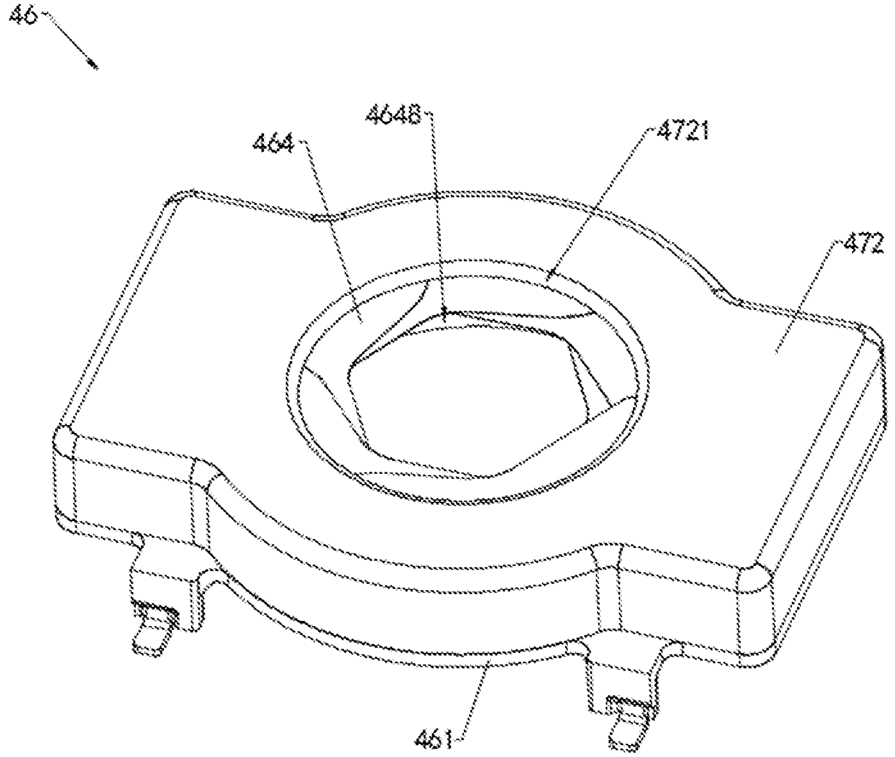
FIG. 32 is a schematic diagram of a structure of the variable aperture shown in FIG. 5 from another angle.

FIG. 32 is a schematic diagram of the structure of the variable aperture 4646 shown in FIG. 5 from another angle. The housing 472 is fastened to the base 461. For example, the housing 472 may be fastened to the base 461 in a fastening manner, a soldering manner, or a bonding manner. It may be understood that, when the housing 472 is fastened to the base 461, the housing 472 may cover related components (for example, the rotation ring 462, the blade 464, the first circuit board 465, the piezoelectric ceramic 466, the elastic component 467, the magnet 468, the second circuit board 469, the position sensor 470, the magnetic conductive sheet 471, and the like) of the variable aperture 46. In this way, in one aspect, the housing 472 can be configured to protect the related components of the variable aperture 46. In another aspect, the variable aperture 46 is more integral.

In addition, the housing 472 is provided with a second via 4721. The second via 4721 is disposed opposite to the aperture hole 4648. In this way, ambient light can enter the aperture hole 4648 through the second via 4721. In this embodiment, the central axis of the aperture hole 4648 coincides with a central axis of the second via 4721. In another embodiment, the central axis of the aperture hole 4648 may alternatively not coincide with the central axis of the first via 4614.

The foregoing specifically describes the structure of the variable aperture 46 with reference to related accompanying drawings. The size of the aperture hole 4648 of variable aperture 46 can be accurately adjusted. In addition, the variable aperture 46 in this application may further resolve some technical problems of a conventional variable aperture. Details are as follows.

First, for a conventional variable aperture in which a size of an aperture hole is controlled by using a magnet and a coil, the aperture hole of the conventional variable aperture is likely to change slightly because of an upper limit of magnetic forces of the magnet and the coil. In other words, a change range of the aperture hole of the conventional variable aperture is limited. However, for the variable aperture 46 in this application, the piezoelectric ceramic 466 deforms under control of the PWM signal, to push the rotation ring 462 to rotate, thereby adjusting the size of the aperture hole 4648. A variation range of the aperture hole 4648 of the variable aperture 46 in this application is not affected by magnetic forces of a magnet and a coil.

In addition, the magnet and the coil of the conventional variable aperture are prone to faulty due to interference of external magnetism or a magnetic conductive component. However, the variable aperture 46 in this application is not interfered by external magnetism or a magnetic conductive component. In this way, the variable aperture 46 in this application has better reliability.

Second, the magnet and the coil of the conventional variable aperture increase a width of the conventional variable aperture in the X-axis direction and a length of the conventional variable aperture in the Y-axis direction to a large extent. The piezoelectric ceramic 466 in this application also increases a width of the variable aperture 46 in the X-axis direction and a length of the variable aperture 46 in the Y-axis direction. However, in this application, the piezoelectric ceramic 466 may flexibly use piezoelectric ceramics 466 of different sizes based on a requirement. In this case, when a piezoelectric ceramic 466 of a relatively small size is selected, both the width of the variable aperture 46 in the X-axis direction and the length of the variable aperture 46 in the Y-axis direction can be reduced to a large extent. This facilitates implementation of a miniaturization design of the variable aperture 46.

In addition, in this application, for the variable aperture 46, the piezoelectric ceramic 466 drives the rotation ring 462 to rotate, to adjust the size of the aperture hole 4648. The variable aperture 46 in this application has a relatively high response speed.

Finally, the variable aperture 46 in this application further has some advantages. Details are as follows.

First, in this application, a structure of the base 461 is improved, so that when the rotation ring 462 is assembled on the base 461, the rotation ring 462 does not interfere with the first via 4614 of the base 461. Specifically, the base 461 is disposed to include the body part 4611 and the first protrusion part 4612, and the bottom of the first protrusion part 4612 is fastened to the body part 4611. In addition, the base 461 is provided with the first via 4614. The first via 4614 penetrates the body part 4611 and the first protrusion part 4612. The rotation ring 462 is sleeved on the outer peripheral side of the first protrusion part 4612, and is rotationally connected to the first protrusion part 4612. In this case, the rotation ring 462 is disposed away from the first via 4614. In this way, when the rotation ring 462 rotates relative to the first protrusion part 4612, the rotation ring 462 does not block the first via 4614 due to tilt or vibration.

In addition, in this application, the piezoelectric ceramic 466 is disposed on the outer side of the rotation ring 462, to prevent the piezoelectric ceramic 466 from interfering with the first via 4614 of the base 461. Specifically, when the piezoelectric ceramic 466 is disposed on the outer side of the rotation ring 462, the piezoelectric ceramic 466 is disposed away from the first via 4614. In this way, when the rotation ring 462 rotates relative to the first protrusion part 4612, the piezoelectric ceramic 466 does not block the first via 4614 due to tilt or vibration.

In addition, the piezoelectric ceramic 466 is disposed on the outer side of the rotation ring 462, to avoid increasing a thickness of the variable aperture 46 because the piezoelectric ceramic 466 is stacked with the base 461 and the rotation ring 462, thereby implementing a thin design of the variable aperture 46. In this way, applying the variable aperture 46 to the electronic device 100 is a better design for an electronic device 100 that has relatively limited internal space and urgently requires a thin form.

In addition, by disposing the piezoelectric ceramic 466 on the outer side of the rotation ring 462, a forming difficulty of the piezoelectric ceramic 466 can be reduced, thereby implementing mass production. It may be understood that, for a piezoelectric ceramic provided with a hole or a groove, a processing difficulty is relatively high, and mass production is not easy. In this embodiment, the piezoelectric ceramic 466 is disposed on the outer side of the rotation ring 462, to avoid a structure design in which a structure such as a via or a groove needs to be provided on the piezoelectric ceramic 466 to avoid affecting the first via 4614. In this way, the piezoelectric ceramic 466 has a simple structure and mass production is easy to be implemented.

In addition, by disposing the piezoelectric ceramic 466 on the outer side of the rotation ring 462, the piezoelectric ceramic 466 does not interfere with the first via 4614, so that the piezoelectric ceramic 466 is not limited in size. Specifically, both a width of the piezoelectric ceramic 466 in the X-axis direction and a length of the piezoelectric ceramic 466 in the Y-axis direction in this application can be flexibly designed based on a requirement. In this case, when the piezoelectric ceramic 466 with a relatively small size is used, the width of the variable aperture 46 in the X-axis direction and the length of the variable aperture 46 in the Y-axis direction may be greatly reduced, that is, a miniaturization design of the variable aperture 46 is easily implemented. Applying the variable aperture 46 to the electronic device 100 is a better design for the electronic device 100 whose internal space is extremely valuable.

In addition, the variable aperture 46 in this application not only considers various structure designs, but also considers electrical connections between components, thereby significantly improving integrity of the variable aperture 46. For example, the first internal pin end **4616*a* and the first external pin end 4615*a* are disposed on the base 461, so that the piezoelectric ceramic 466 can be electrically connected to the external device of the variable aperture 46 by using the first circuit board 465, the first internal pin end 4616*a*, and the first external pin end 4615*a*. For another example, the second internal pin end 4616*b* and the second external pin end 4615*b* are disposed on the base 461, so that the position sensor 470 can be electrically connected to the external device of the variable aperture 46 by using the second circuit board 469, the second internal pin end 4616*b*, and the second external pin end 4615*b***.

Finally, the variable aperture 46 in this application can further implement a closed-loop effect. Specifically, the position sensor 470 can detect magnetic field strength obtained when the magnet 468 is at different positions. In this way, an angle at which the rotation ring 462 rotates relative to the base 461 may be determined by using the magnetic field strength detected by the position sensor 470, to accurately determine a state of the variable aperture 46, that is, accurately determine the hole diameter of the aperture hole 4648 of the variable aperture 46, thereby accurately controlling the light flux entering the variable aperture 46.

The foregoing specifically describes the structure of the variable aperture 46 with reference to related accompanying drawings. The following describes several implementations of the structure of the variable aperture 46 with reference to related accompanying drawings.

Figure 33:
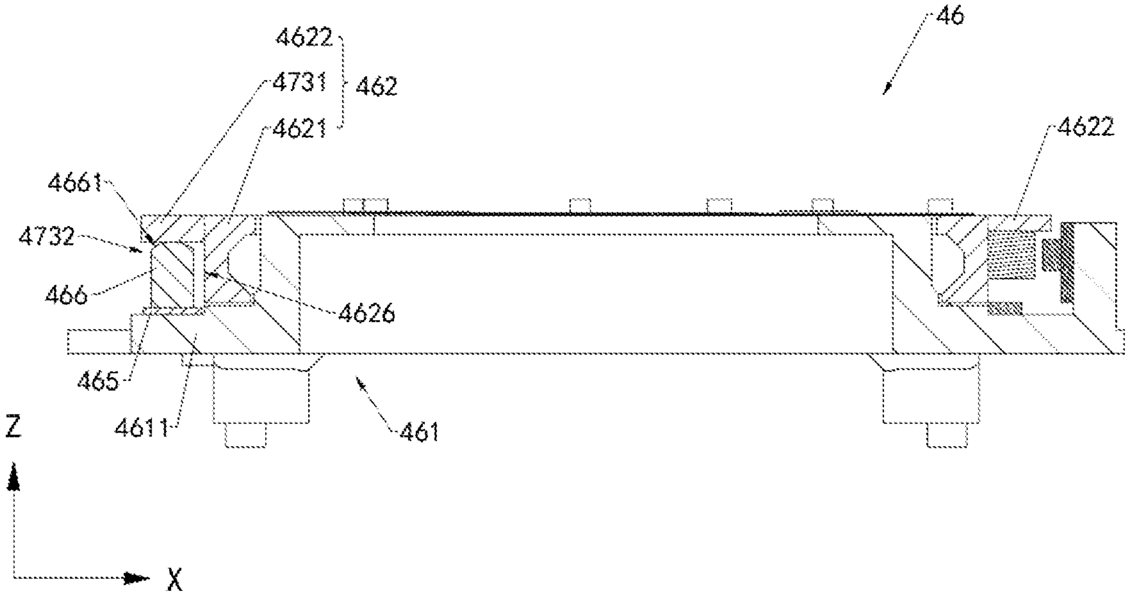
FIG. 33 is schematic sectional diagram of a part of another implementation of the variable aperture shown in FIG. 5.

In a second implementation, technical content that is the same as that in the first implementation is not described again. FIG. 33 is a partial sectional view of another implementation of the variable aperture 46 shown in FIG. 5. The rotation ring 462 further includes a second bump 4731. The second bump 4731 of the rotation ring 462 is convexly disposed on the outer ring surface 4626 of the annular frame 4621. The second bump 4731 of the rotation ring 462 and the first bump 4622 of the rotation ring 462 are disposed at an interval. The second bump 4731 of the rotation ring 462, the annular frame 4621, and the body part 4611 of the base 461 form first space 4732 by enclosing. It should be noted that, the reference number 4622 on the left of FIG. 33 is used to indicate that 4622, 4731, and 4621 belong to 462. A component indicated by 4622 is marked on the right side of FIG. 33.

In addition, the first circuit board 465 is fastened to the body part 4611 of the base 461. The piezoelectric ceramic 466 is fastened to a side that is of the first circuit board 465 and that is away from the body part 4611. The piezoelectric ceramic 466 is located in the first space 4732. The first surface 4661 of the piezoelectric ceramic 466 contacts the second bump 4731 of the rotation ring 462. The piezoelectric ceramic 466 can exert an action force on the second bump 4731 of the rotation ring 462. A direction of the action force is the direction of the thickness of the variable aperture 46, that is, the Z-axis positive direction. For example, an elastic component is disposed between the first circuit board 465 and the body part 4611 of the base 461, so that an elastic force of the elastic component is used to exert an action force on the piezoelectric ceramic 466, so that the piezoelectric ceramic 466 exerts the action force on the second bump 4731 of the rotation ring 462.

It may be understood that, compared with the variable aperture 46 in the first implementation, in this implementation, the first circuit board 465 of the variable aperture 46 and the piezoelectric ceramic 466 are stacked in the Z-axis direction, to reduce a size of the variable aperture 46 in the X-axis direction.

Figure 34:
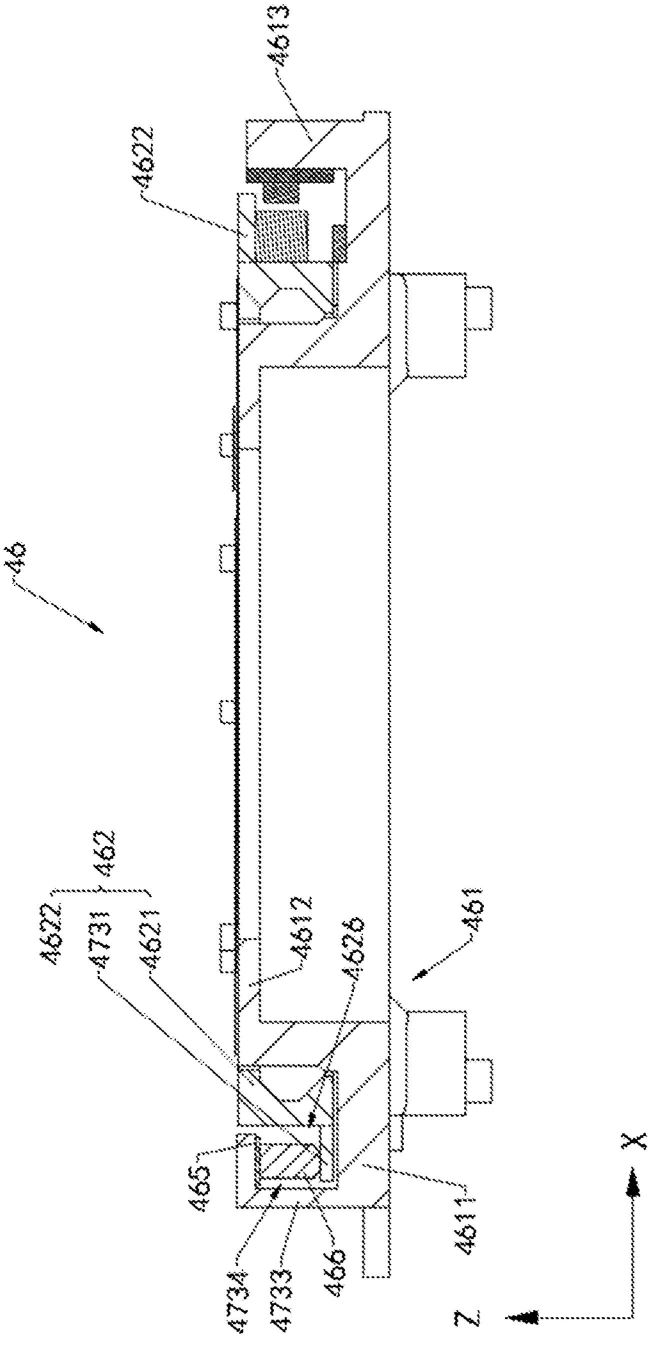
FIG. 34 is schematic sectional diagram of a part of still another implementation of the variable aperture shown in FIG. 5.

In a third implementation, technical content that is the same as that in the first implementation is not described again. FIG. 34 is a partial sectional view of still another implementation of the variable aperture 46 shown in FIG. 5. The rotation ring 462 further includes a second bump 4731. The second bump 4731 of the rotation ring 462 is convexly disposed on the outer ring surface 4626 of the annular frame 4621. In addition, the second bump 4731 of the rotation ring 462 and the first bump 4622 of the rotation ring 462 are disposed at an interval. It should be noted that, the reference number 4622 on the left of FIG. 34 is used to indicate that 4622, 4731, and 4621 belong to 462. A component indicated by 4622 is marked on the right side of FIG. 34.

In addition, the base 461 further includes a third protrusion part 4733. The third protrusion part 4733 is convexly disposed on a surface of the body part 4611. The third protrusion part 4733, the first protrusion part 4612, and the second protrusion part 4613 are located on a same side of the body part 4611, and are disposed at an interval. The third protrusion part 4733 of the base 461, the second bump 4731 of the rotation ring 462, and the annular frame 4621 of the rotation ring 462 form second space 4734 by enclosing. A part of the third protrusion part 4733 is disposed opposite to the second bump 4731 of the rotation ring 462.

In addition, the first circuit board 465 is fastened to the third protrusion part 4733 of the base 461. The first circuit board 465 is located in the second space 4734, and is disposed opposite to the second bump 4731 of the rotation ring 462. The piezoelectric ceramic 466 is fastened to a side that is of the first circuit board 465 and that faces the second bump 4731. The first surface 4661 of the piezoelectric ceramic 466 contacts the second bump 4731 of the rotation ring 462. The piezoelectric ceramic 466 can exert an action force on the second bump 4731 of the rotation ring 462. A direction of the action force is the direction of the thickness of the variable aperture 46. For example, an elastic component is disposed between the first circuit board 465 and the third protrusion part 4733 of the base 461, so that an elastic force of the elastic component is used to exert an action force on the piezoelectric ceramic 466, so that the piezoelectric ceramic 466 exerts the action force on the second bump 4731 of the rotation ring 462.

It may be understood that, compared with the variable aperture 46 in the first implementation, in this implementation, the first circuit board 465 of the variable aperture 46 and the piezoelectric ceramic 466 are stacked in the Z-axis direction, to reduce a size of the variable aperture 46 in the X-axis direction.

Figure 35:
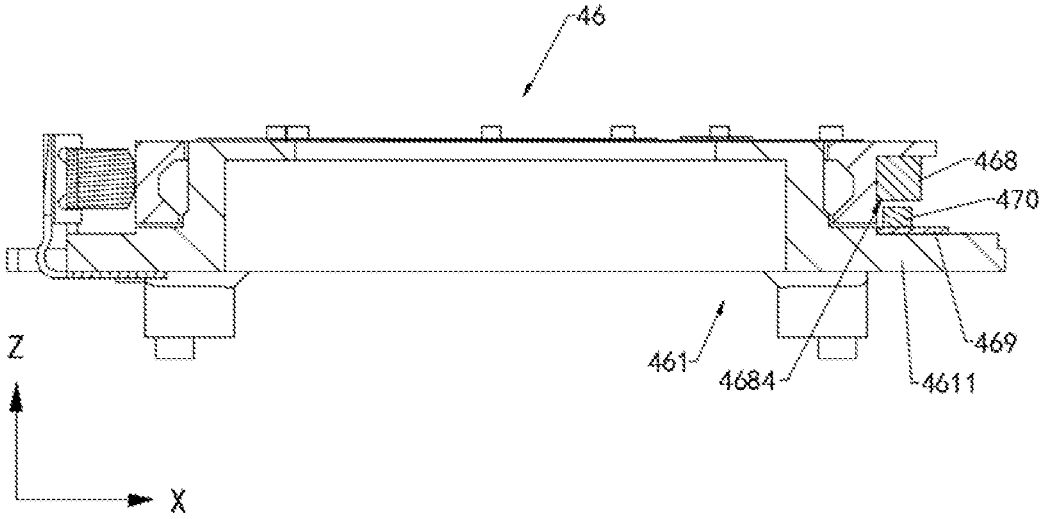
FIG. 35 is schematic sectional diagram of a part of yet another implementation of the variable aperture shown in FIG. 5.

In a fourth implementation, technical content that is the same as that in the first implementation is not described again. FIG. 35 is a partial sectional view of yet another implementation of the variable aperture 46 shown in FIG. 5. The second circuit board 469 is fastened to a surface that is of the body part 4611 of the base 461 and that faces the magnet 468. In addition, the position sensor 470 is fastened to a side that is of the second circuit board 469 and that faces the magnet 468. The position sensor 470 is disposed opposite to the lower surface 4684 of the magnet 468. The position sensor 470 is configured to detect magnetic field strength obtained when the magnet 468 is at different positions.

In this implementation, the second circuit board 469 is fastened to the body part 4611 of the base 461. Therefore, compared with the base 461 in the first implementation, the base 461 in this implementation may omit the second protrusion part 4613 of the base 461, thereby facilitating lightweight setting of the variable aperture 46. In addition, the structure of variable aperture 46 is more compact.

It may be understood that, compared with the variable aperture 46 in the first implementation, in this implementation, the second circuit board 469 of the variable aperture 46 and the position sensor 470 are stacked in the Z-axis direction, to reduce a size of the variable aperture 46 in the X-axis direction.

It may be understood that the fourth implementation solution may also be combined with the second implementation solution or the third implementation solution. Details are not described herein again.

Figure 36:
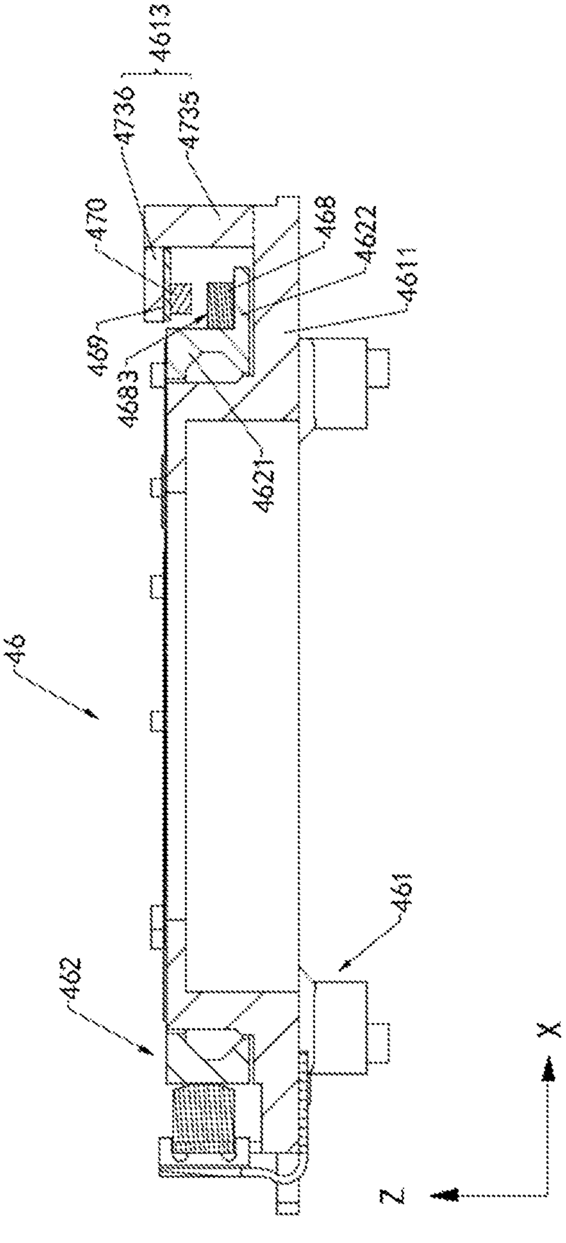
FIG. 36 is schematic sectional diagram of a part of yet still another implementation of the variable aperture shown in FIG. 5.

In a fifth implementation, technical content that is the same as that in the first implementation is not described again. FIG. 36 is a partial sectional view of yet still another implementation of the variable aperture 46 shown in FIG. 5. An opening of the first bump 4622 of the rotation ring 462 faces the body part 4611 of the base 461.

In addition, the second protrusion part 4613 of the base 461 includes a first segment 4735 and a second segment 4736 connected to the first segment 4735. The first segment 4735 of the second protrusion part 4613 is connected to the body part 4611 of the base 461. The second segment 4736 of the second protrusion part 4613 is disposed opposite to the body part 4611 of the base 461. In this case, the second protrusion part 4613 of the base 461 is approximately in a "¬" shape. In addition, the first segment 4735 of the second protrusion part 4613 is disposed opposite to the annular frame 4621 of the rotation ring 462. The second segment 4736 of the second protrusion part 4613 is disposed opposite to the first bump 4622 of the rotation ring 462.

The magnet 468 is fastened to the first bump 4622 of the rotation ring 462. The second circuit board 469 is fastened to a surface that is of the second segment 4736 of the second protrusion part 4613 and that faces the magnet 468. In addition, the position sensor 470 is fastened to a side that is of the second circuit board 469 and that faces the magnet 468. The position sensor 470 is disposed opposite to the upper surface 4683 of the magnet 468. The position sensor 470 is configured to detect magnetic field strength obtained when the magnet 468 is at different positions.

It may be understood that the fifth implementation solution may also be combined with the second implementation solution or the third implementation solution. Details are not described herein again.

Figure 37:
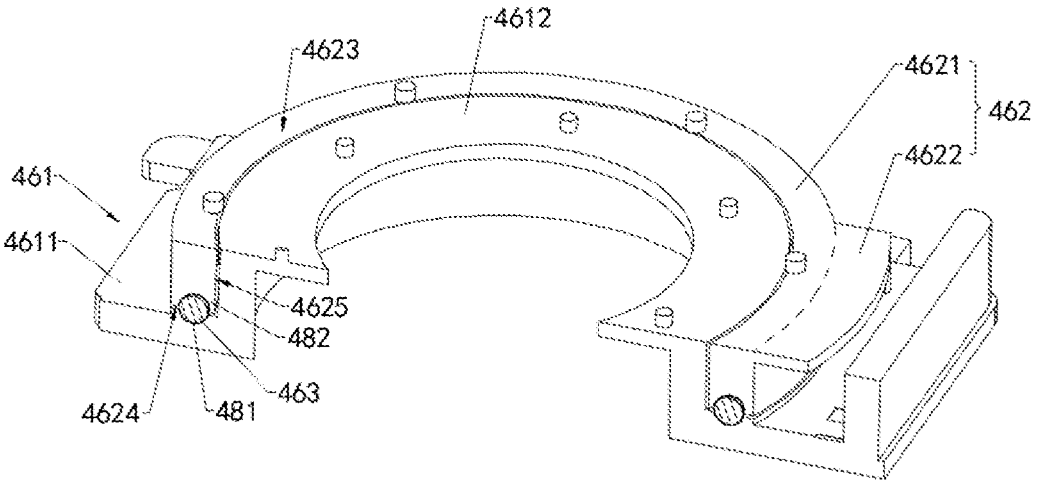
FIG. 37 is schematic sectional diagram of a part of a further implementation of the variable aperture 46 shown in FIG. 5.

In a sixth implementation, technical content that is the same as that in the first implementation is not described again. FIG. 37 is a partial sectional view of a further implementation of the variable aperture 46 shown in FIG. 5. The body part 4611 is further provided with a plurality of grooves 481 disposed at an interval. An opening of the groove 481 is located on a surface that is of the body part 4611 and that faces the annular frame 4621. The annular frame 4621 is provided with an annular groove 482. The annular groove 482 is formed by inwardly curving the lower end face 4624 of the annular frame 4621 towards the upper end face 4623 of the annular frame 4621.

In addition, a part of the roll ball 463 is disposed in the groove 481 of the body part 4611. The other part of the roll ball 463 is disposed in the annular groove 482 of the annular frame 4621. A groove wall of the groove 481 may limit movement of the roll ball 463, to prevent the roll ball 463 from sliding out of the groove 481. The roll ball 463 may rotate in any direction relative to the groove wall of the groove 481. In addition, the roll ball 463 can roll within the annular groove 482, that is, the roll ball 463 is connected to the annular frame 4621 of the rotation ring 462 in a rolling manner. In this way, the rotation ring 462 can be rotationally connected to the base 461 by using the roll ball 463. A friction force between the rotation ring 462 and the base 461 is relatively small.

In addition, the inner ring surface 4625 of the annular frame 4621 may be disposed at an interval with the first protrusion part 4612 of the base 461. In this way, a contact area between the annular frame 4621 and the base 461 is relatively small. The friction force between the annular frame 4621 and the base 461 is further reduced. In another embodiment, the inner ring surface 4625 of the annular frame 4621 may alternatively contact the first protrusion part 4612 of the base 461.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A driving apparatus comprising:

a variable aperture, the variable aperture comprising a base, a rotation ring, a plurality of blades, and a piezoelectric ceramic;

the base comprising a body part and a first protrusion part, a bottom of the first protrusion part is fastened to the body part, the base is provided with a first via, and the first via penetrates the first protrusion part and the body part;

the rotation ring being sleeved on an outer peripheral side of the first protrusion part, and being rotationally connected to at least one of the first protrusion part or the body part;

the plurality of blades being located on a side that is of the first protrusion part and that is away from the body part, the plurality of blades being distributed in an annular manner and enclosing together to form an aperture hole, the aperture hole being disposed opposite to the first via, and each blade being rotationally connected to the rotation ring and being slidably connected to the first protrusion part; and the piezoelectric ceramic being fastened to the base and being located on an outer side of the rotation ring, the piezoelectric ceramic and the rotation ring being on a same side of the body part of the base, the piezoelectric ceramic being configured to deform under signal control to drive the rotation ring to rotate relative to the base, each blade configured to rotate relative to the rotation ring and slide relative to the first protrusion part, and change a hole diameter of the aperture hole;

wherein the body part is provided with a first internal pin end and a first external pin end that are disposed at an interval, the first external pin end is electrically connected to the first internal pin end, and the first external pin end is configured to electrically connect to an external device of the variable aperture;

the variable aperture further comprises a first circuit board, wherein the first circuit board is fastened to the body part, and the first circuit board is electrically connected to the first internal pin end;

the piezoelectric ceramic is fastened to the first circuit board, and is electrically connected to the first circuit board; and wherein the variable aperture further comprises an elastic component, the elastic component is fastened to the body part, the first circuit board is fastened to the elastic component, and the elastic component is configured to squeeze the first circuit board, so that the piezoelectric ceramic exerts an action force on the rotation ring.

2. The driving apparatus according to claim 1, wherein the piezoelectric ceramic is in a strip shape.

3. The driving apparatus according to claim 1, wherein a quantity of first internal pin ends and a quantity of first external pin ends are both two, the first internal pin ends and the first external pin ends are electronically connected in a one-to-one correspondence, and the first internal pin ends are both located on a surface that is of the body part and that is away from the first protrusion part;

wherein the body part is further provided with a first side hole and a second side hole that are disposed at an interval, wherein one of the first internal pin ends is located on a periphery of the first side hole, and the other first internal pin end is located on a periphery of the second side hole; and wherein the first circuit board comprises a main part and a first extension part and a second extension part that are disposed opposite to each other, the main part is connected between the first extension part and the second extension part, the piezoelectric ceramic is fastened to the main part and is electrically connected to the main part, the first extension part passes through the first side hole and is electrically connected to one of the first internal pin ends, and the second extension part passes through the second side hole and is electrically connected to the other first internal pin end.

4. The driving apparatus according to claim 1, wherein the elastic component comprises a first fastening part, a connection part, and a second fastening part that are sequentially connected, the connection part is in an arc shape, the first fastening part is fastened to a side that is of the body part and that is away from the first protrusion part, the second fastening part is located on a side that is of the rotation ring and that is away from the first protrusion part, and the first circuit board is fastened to the second fastening part; and wherein the first fastening part is provided with a first limiting hole and a second limiting hole that are disposed at an interval, the body part is further provided with a first limiting post and a second limiting post that are disposed at an interval, the first limiting post and the second limiting post are convexly disposed on a surface that is of the body part and that is away from the first protrusion part, the first limiting post is disposed in the first limiting hole, and the second limiting post is disposed in the second limiting hole.

5. The driving apparatus according to claim 1, wherein the variable aperture further comprises a magnet and a position sensor, wherein the magnet is fastened to the rotation ring, the position sensor is fastened to the body part, and the position sensor is configured to detect magnetic field strength obtained when the magnet is at different positions.

6. The driving apparatus according to claim 5, wherein the body part is provided with a second internal pin end and a second external pin end that are disposed at an interval, the second internal pin end is electrically connected to the second external pin end, and the second external pin end is configured to electrically connect to the external device of the variable aperture;

wherein the variable aperture further comprises a second circuit board, wherein the second circuit board is fastened to the body part, and the second circuit board is electrically connected to the second internal pin end; and wherein the position sensor is fastened to the second circuit board and is electrically connected to the second circuit board.

7. The driving apparatus according to claim 6, wherein the body part is provided with a second protrusion part, the second protrusion part is disposed at an interval with the first protrusion part, the second protrusion part is located on the side that is of the rotation ring and that is away from the first protrusion part, and the magnet is disposed opposite to the second protrusion part; and wherein the second circuit board is fastened to a surface that is of the second protrusion part and that faces the magnet.

8. The driving apparatus according to claim 5, wherein the rotation ring comprises an annular frame and a first bump, the first bump is convexly disposed on an outer ring surface of the annular frame, and the first bump and the annular frame enclose to form an accommodating space; and wherein the magnet is disposed in the accommodating space, one side of the magnet is fastened to the annular frame, and the other side of the magnet is fastened to the first bump.

9. The driving apparatus according to claim 5, wherein the variable aperture further comprises a magnetic conductive sheet, the magnetic conductive sheet is fastened to the body part, and the magnetic conductive sheet is disposed opposite to the magnet.

10. The driving apparatus according to claim 1, wherein the first protrusion part is further provided with a plurality of grooves disposed at an interval, and an opening of a groove is located on a peripheral side surface of the first protrusion part;

wherein the rotation ring is further provided with an annular groove and an annular frame, and the annular groove is formed by inwardly curving an inner ring surface of the annular frame towards an outer ring surface of the annular frame; and wherein the variable aperture further comprises a plurality of roll balls, the plurality of roll balls and the plurality of grooves are disposed in a one-to-one correspondence, a part of each roll ball is disposed in the groove, and the other part of each roll ball is disposed in the annular groove, each roll ball rotates relative to a groove wall of the groove, and each roll ball further rolls relative to a groove wall of the annular groove.

11. The driving apparatus according to claim 1, wherein each of the blades comprises a first part, a second part, and a third part that are connected in sequence, wherein the first part is rotationally connected to the rotation ring, the second part is slidably connected to the first protrusion part, and third parts of the plurality of blades together form the aperture hole by enclosing.

12. The driving apparatus according to claim 11, wherein the first protrusion part is provided with a plurality of first fastening posts disposed at an interval, and the rotation ring is further provided with a plurality of second fastening posts disposed at an interval;

wherein the first part of each blade is provided with a rotation hole, the plurality of second fastening posts are disposed in a one-to-one correspondence with rotation holes of the plurality of blades, and a first fastening post is rotationally connected to a hole wall of the rotation hole; and wherein the second part of each blade is provided with a guide hole, the plurality of first fastening posts are disposed in a one-to-one correspondence with guide holes of the plurality of blades, and the first fastening post is slidably connected to a hole wall of the guide hole.

13. An electronic device comprising:

a driving apparatus and a lens assembly, wherein the driving apparatus comprises a variable aperture, and the variable aperture is fastened to the lens assembly and is located on a light inlet side of the lens assembly;

wherein the variable aperture comprises a base, a rotation ring, a plurality of blades, and a piezoelectric ceramic;

wherein the base comprises a body part and a first protrusion part, a bottom of the first protrusion part is fastened to the body part, the base is provided with a first via, and the first via penetrates the first protrusion part and the body part;

wherein the rotation ring is sleeved on an outer peripheral side of the first protrusion part, and is rotationally connected to at least one of the first protrusion part or the body part;

wherein the plurality of blades is located on a side that is of the first protrusion part and that is away from the body part, the plurality of blades are distributed in an annular manner and together form an aperture hole by enclosing, the aperture hole is disposed opposite to the first via, and each blade is rotationally connected to the rotation ring and is slidably connected to the first protrusion part;

wherein the piezoelectric ceramic is fastened to the base and is located on an outer side of the rotation ring, the piezoelectric ceramic and the rotation ring being on a same side of the body part of the base, the piezoelectric ceramic is configured to deform under signal control, to drive the rotation ring to rotate relative to the base, each blade is configured to rotate relative to the rotation ring and slide relative to the first protrusion part, and change a hole diameter of the aperture hole;

wherein the variable aperture further comprises a magnet and a position sensor, wherein the magnet is fastened to the rotation ring, the position sensor is fastened to the body part, and the position sensor is configured to detect magnetic field strength obtained when the magnet is at different positions;

wherein the rotation ring comprises an annular frame and a first bump, the first bump is convexly disposed on an outer ring surface of the annular frame, and the first bump and the annular frame enclose to form an accommodating space; and wherein the magnet is disposed in the accommodating space, one side of the magnet is fastened to the annular frame, and the other side of the magnet is fastened to the first bump.

14. The electronic device according to claim 13, wherein the piezoelectric ceramic is in a strip shape.

15. An electronic device comprising:

a lens assembly; and a driving apparatus, the driving apparatus comprising a variable aperture, the variable aperture comprising a base, a rotation ring, a plurality of blades, and a piezoelectric ceramic, wherein the base comprises a body part and a first protrusion part, a bottom of the first protrusion part is fastened to the body part, the base is provided with a first via, and the first via penetrates the first protrusion part and the body part, wherein the rotation ring is sleeved on an outer peripheral side of the first protrusion part, and is rotationally connected to at least one of the first protrusion part or the body part, wherein the plurality of blades is located on a side that is of the first protrusion part and that is away from the body part, the plurality of blades being distributed in an annular manner and enclose together to form an aperture hole, the aperture hole is disposed opposite to the first via, and each blade is rotationally connected to the rotation ring and is slidably connected to the first protrusion part, wherein the piezoelectric ceramic is fastened to the base and is located on an outer side of the rotation ring, the piezoelectric ceramic and the rotation ring being on a same side of the body part of the base, the piezoelectric ceramic being configured to deform under signal control to drive the rotation ring to rotate relative to the base, each blade configured to rotate relative to the rotation ring and slide relative to the first protrusion part, and change a hole diameter of the aperture hole;

wherein the variable aperture of the driving apparatus is fastened to the lens assembly and is located on a light inlet side of the lens assembly;

wherein the variable aperture further comprises a magnet and a position sensor, wherein the magnet is fastened to the rotation ring, the position sensor is fastened to the body part, and the position sensor is configured to detect magnetic field strength obtained when the magnet is at different positions;

wherein the body part is provided with a second internal pin end and a second external pin end that are disposed at an interval, the second internal pin end is electrically connected to the second external pin end, and the second external pin end is configured to electrically connect to an external device of the variable aperture;

wherein the variable aperture further comprises a second circuit board, wherein the second circuit board is fastened to the body part, and the second circuit board is electrically connected to the second internal pin end;

wherein the position sensor is fastened to the second circuit board and is electrically connected to the second circuit board;

wherein the body part is provided with a second protrusion part, the second protrusion part is disposed at an interval with the first protrusion part, the second protrusion part is located on the side that is of the rotation ring and that is away from the first protrusion part, and the magnet is disposed opposite to the second protrusion part; and wherein the second circuit board is fastened to a surface that is of the second protrusion part and that faces the magnet.

16. The electronic device according to claim 15, wherein the lens assembly comprises a motor and a camera lens, the camera lens is disposed on the motor, and the motor is configured to drive the camera lens to move in an optical axis direction of the lens assembly; and wherein the variable aperture is fastened to the camera lens and is located on a light inlet side of the camera lens.

* * * * *